(12) United States Patent
Dress

(10) Patent No.: US 9,674,116 B2
(45) Date of Patent: Jun. 6, 2017

(54) DATA DISTRIBUTION PACKET-FLOW INTERCONNECT FABRIC MODULAR MANAGEMENT OPTIMIZED SYSTEM

(71) Applicant: LightFleet Corporation, Camas, WA (US)

(72) Inventor: William Dress, Camas, WA (US)

(73) Assignee: Lightfleet Corporation, Vancouver, WA (US)

( * ) Notice: Subject to any disclaimer, the term of this patent is extended or adjusted under 35 U.S.C. 154(b) by 77 days.

(21) Appl. No.: 13/848,688

(22) Filed: Mar. 21, 2013

(65) Prior Publication Data

US 2014/0314099 A1  Oct. 23, 2014

Related U.S. Application Data

(60) Provisional application No. 61/685,657, filed on Mar. 21, 2012, provisional application No. 61/622,093, filed on Apr. 10, 2012.

(51) Int. Cl.
*H04L 12/933* (2013.01)
*H04L 12/721* (2013.01)
*H04L 12/715* (2013.01)

(52) U.S. Cl.
CPC ............ *H04L 49/15* (2013.01); *H04L 45/62* (2013.01); *H04L 45/04* (2013.01)

(58) Field of Classification Search
CPC ..... H04L 49/15; H04L 12/721; H04L 12/715; H04L 12/825; H04L 45/62; H04L 45/04; H04Q 11/00
See application file for complete search history.

(56) References Cited

U.S. PATENT DOCUMENTS

| | | | | |
|---|---|---|---|---|
| 5,898,801 A | * | 4/1999 | Braun | H04J 14/02 385/24 |
| 5,901,260 A | * | 5/1999 | Braun | G02B 6/2804 385/24 |
| 6,567,576 B2 | * | 5/2003 | MacDonald | 385/17 |
| 6,665,495 B1 | * | 12/2003 | Miles | H04L 45/00 370/351 |
| 6,728,486 B1 | * | 4/2004 | Hutchison | H04J 14/0206 398/59 |

(Continued)

FOREIGN PATENT DOCUMENTS

WO  2002/041663  5/2002

OTHER PUBLICATIONS

Mohammad Al-Fares, Alexander Loukissas, Amin Vahdat, titled "A scalable, commodity data center network architecture," (Vahdat hereinafter) was published in Proceeding SIGCOMM '08 Proceedings of the ACM SIGCOMM 2008 conference on Data communication in Oct. 2008, pp. 63 through 74.*

(Continued)

*Primary Examiner* — Andrew Lai
*Assistant Examiner* — Hoyet H Andrews, III
(74) *Attorney, Agent, or Firm* — John Bruckner PC

(57) ABSTRACT

A method includes operating a packet flow module including a plurality of ports, each of the plurality of ports including at least a pair of bidirectional and logically independent communications channels. An apparatus includes a packet flow module including a plurality of ports, each of the plurality of ports including at least a pair of bidirectional and logically independent communications channels.

14 Claims, 27 Drawing Sheets

(56) References Cited

U.S. PATENT DOCUMENTS

| | | | |
|---|---|---|---|
| 6,735,393 B1* | 5/2004 | Zouganeli | H04Q 11/0005 398/48 |
| 6,763,191 B1* | 7/2004 | Handelman | H04Q 11/0005 398/45 |
| 7,162,155 B2* | 1/2007 | Handelman | H04Q 11/0005 370/235 |
| 7,206,511 B1* | 4/2007 | Hill | H04J 3/12 398/153 |
| 7,236,704 B1* | 6/2007 | Cao | G02B 6/2931 398/83 |
| 7,349,629 B1* | 3/2008 | Soderberg | H04B 10/2503 385/14 |
| RE41,247 E * | 4/2010 | Braun | H04J 14/02 359/215.1 |
| 8,849,110 B2* | 9/2014 | Bader | H04Q 11/0005 398/45 |
| 8,879,910 B2* | 11/2014 | Uekama | H04L 45/62 398/45 |
| 8,886,039 B2* | 11/2014 | Uekama | H04L 45/62 398/45 |
| 8,891,963 B2* | 11/2014 | Patel | H04L 12/00 370/360 |
| 8,934,347 B1* | 1/2015 | Bratt | G06F 13/4221 370/237 |
| 2002/0006110 A1* | 1/2002 | Brezzo et al. | 370/229 |
| 2002/0102050 A1* | 8/2002 | Chauvin et al. | 385/24 |
| 2002/0197007 A1* | 12/2002 | Liu | H04B 10/27 385/24 |
| 2003/0035167 A1* | 2/2003 | Hill | H04Q 11/0062 398/58 |
| 2003/0039015 A1* | 2/2003 | Vujkovic-Cvijin | H01S 3/1303 398/197 |
| 2003/0117945 A1* | 6/2003 | Zboril | H04J 3/14 370/216 |
| 2003/0117998 A1* | 6/2003 | Sala | H04Q 11/0067 370/351 |
| 2003/0231823 A1* | 12/2003 | Furuyama | 385/24 |
| 2004/0208233 A1* | 10/2004 | Dafesh | H04J 14/005 375/147 |
| 2004/0208418 A1* | 10/2004 | Handelman | H04J 14/02 385/15 |
| 2005/0084267 A1* | 4/2005 | Fan | H04J 14/0227 398/84 |
| 2006/0221948 A1* | 10/2006 | Benner | H04L 47/10 370/389 |
| 2007/0280265 A1* | 12/2007 | Gerstel | H04J 14/0256 370/395.52 |
| 2008/0008472 A1* | 1/2008 | Dress | H04B 10/803 398/66 |
| 2008/0260383 A1* | 10/2008 | Zhong | H04J 14/0209 398/50 |
| 2008/0285449 A1* | 11/2008 | Larsson | H04L 49/1515 370/232 |
| 2010/0020806 A1 | 1/2010 | Vahdat et al. | |
| 2011/0044693 A1* | 2/2011 | Kelly et al. | 398/116 |
| 2014/0270762 A1* | 9/2014 | Li | H04L 45/02 398/45 |

OTHER PUBLICATIONS

William Dress, titled; "Understanding Lightfleet's Direct Broadcast Optical Interconnect", dated Apr. 2010, also listed on Applicants IDS.*

William Dress, titled; "Understanding Lighifleet's Direct Broadcast Optical Interconnect", dated Apr. 2010.*

William Dress, titled; "Understanding Lightfleet's Direct Broadcast Optical Interconnect", dated Apr. 2010.*

Dress, (William Dress, titled; "Understanding Lightfleet's Direct Broadcast Optical Interconnect", dated Apr. 2010).*

Notification, International Search Report and Written Opinion from PCT/US2013/033390, dated Jun. 11, 2013.

William Dress, "Properties of LIghtfleet's direct broadcast optical interconnect", Jun. 15, 2010, pp. 1-10.

* cited by examiner

TABLE 1. Properties of the $p$-port tree with $\ell$ levels and $k$ traffic ports.

| Property | Value[1] |
|---|---|
| Ports per $f$node | $p$ |
| Ports per link | $k$ |
| Levels in tree | $\ell$ |
| Arity $(a)$ | $\dfrac{p}{k} - 1$ |
| $f$nodes $(m)$ | $\dfrac{k(a^\ell - 1)}{p - 2k}$ |
| cnodes[2] $(n)$ | $(p - k)a^{\ell-1}$ |
| Ports | $pm$ |
| Density[3] $(\rho)$ | $\dfrac{a^\ell}{a^\ell - 1}(p - 2k)$ |
| Bisection bandwidth $(B)$ | $\dfrac{p-k}{2}$ |
| Paths[4] $(R)$ | $k^{2\ell^* - 2}$ |
| Diameter | $2\ell - 1$ |
| Scalability | $\dfrac{m-1}{m}$ |

1. Table is valid when k divides p and arity > 1.
2. Each c-node has a single port to its $f$-node.
3. Density is the number of c-nodes per $f$-node and increases as p for large $\ell$.
4. $\ell^*$ is the number of levels in the subtree connecting the two communicating nodes.

FIG. 19

TABLE 2. Properties of selected fat tree topologies

| Property | 12 Ports | 32 Ports | 48 Ports | 72 Ports |
|---|---|---|---|---|
| Factors[1] | {3,2,2,1} | {2,2,2,2,1} | {3,2,2,2,2,1} | {3,3,2,2,2,1} |
| Levels[2] | 3 | 5 | 5 | 5 |
| ƒnodes | 16 | 367 | 2,776 | 10,102 |
| cnodes | 120 | 10,080 | 121,440 | 685,440 |
| Ports | 192 | 11,744 | 133,248 | 727,344 |
| Density | 7.5 | 27.5 | 43.7 | 67.9 |
| Bisection bandwidth | 6 | 16 | 24 | 36 |
| Paths[3] | 16 | 2,048 | 2,048 | 3,072 |
| Diameter | 5 | 9 | 9 | 9 |

1. Factorization of the number of ports in an ƒnode.
2. Number of levels is one less than the number of factors.
3. The values given are for between cnodes in different subtrees.

FIG. 20

TABLE 3. Properties of a symmetric $p$-port Clos network.

| Property | Value |
|---|---|
| Ports per $f$node | $p$ |
| Levels | $\ell$ |
| $f$nodes $(m)$ | $\ell\left(\frac{p}{2}\right)$ |
| cnodes[1] $(n)$ | $2\left(\frac{p}{2}\right)^2$ |
| Ports[2] | $2\ell\left(\frac{p}{2}\right)^2$ |
| Density | $\frac{2}{\ell}\left(\frac{p}{2}\right)$ |
| Bisection bandwidth | $\frac{1}{2}(\ell-1)\left(\frac{p}{2}\right)^2$ |
| Paths | $\left(\frac{p}{2}\right)^{\ell-2}$ |
| Diameter | $2\ell - 1$ |

1. This value is for bidirectional channels. The number of cnodes is half this number for unidirectional channels.
2. The number of ports is always $pxm$, but it often helps to display the dependence on $p$ directly.

FIG. 21

TABLE 4. Properties of the augmented $p$-port Clos network.

| Property | Value |
| --- | --- |
| Ports per pod[1] | $2\left(\frac{p}{2}\right)^2$ |
| Levels[2] | $\ell$ |
| $f$nodes[3] $(m)$ | $2\ell\left(\frac{p}{2}\right)^3$ |
| cnodes $(n)$ | $2\left(\frac{p}{2}\right)^4$ |
| Ports | $4\ell\left(\frac{p}{2}\right)^4$ |
| Density | $\frac{1}{\ell}\left(\frac{p}{2}\right)$ |
| Bisection bandwidth | $\frac{1}{2}(\ell-1)\left(\frac{p}{2}\right)^4$ |
| Paths | $\left(\frac{p}{2}\right)^{2\ell-2}$ |
| Diameter | $4\ell - 1$ |

1. These modules are pods containing $p$ each $p$-port interconnects.
2. The number of levels is the number of pod levels.
3. The each $f$node has $p$ ports as in the symmetric Clos network.

FIG. 22

TABLE 5. Properties of a modified $p$-port Clos network[1].

| Property | Value |
| --- | --- |
| Ports per $f$node | $p$ |
| $f$nodes ($m$) | $5\left(\frac{p}{2}\right)^2$ |
| cnodes ($n$) | $2\left(\frac{p}{2}\right)^3$ |
| Ports | $10\left(\frac{p}{2}\right)^3$ |
| Density | $\frac{p}{5}$ |
| Bisection bandwidth[2] | $\left(\frac{p}{2}\right)^3$ |
| Paths | $\left(\frac{p}{2}\right)^2$ |
| Diameter | $2\ell - 1$ |

1. This topology has three levels with the bottom two levels divided into pods, both conceptually and topologically.
2. For $p/2$ odd. $p/2$ must be subtracted from this value.

FIG. 23

TABLE 6. Properties of the augmented, modified $p$-port Clos network[1].

| Property | Value |
|---|---|
| Ports per pod[2] | $2\left(\frac{p}{2}\right)^2$ |
| $p$modules[3] $(m)$ | $10\left(\frac{p}{2}\right)^5$ |
| cnodes $(n)$ | $2\left(\frac{p}{2}\right)^6$ |
| Ports | $20\left(\frac{p}{2}\right)^6$ |
| Density | $\frac{1}{5}\left(\frac{p}{2}\right)$ |
| Bisection bandwidth | $\left(\frac{p}{2}\right)^6$ |
| Paths | $\left(\frac{p}{2}\right)^4$ |
| Diameter[4] | $4\ell - 1$ |

1. As above, there are 3 levels in this topology.
2. Each pod contains $p$ each $p$-port module.
3. The each $p$-module in an $f$-node has $p$ ports as in the symmetric Clos network.
4. Diameter increases since each pod now has two levels.

FIG. 24

TABLE 7. Properties of a regular mesh topology.[1]

| Property | Value |
|---|---|
| Ports per $f$node | $p$ |
| Communications ports per $f$node | $k$ |
| $c$node ports per $f$node | $p - k$ |
| Grid dimensions | $d$ |
| Grid lengths[2] | $D_1 \times D_2 \times ... \times D_d$ |
| $f$nodes $(m)$ | $D_1 D_2 ... D_d$ |
| $c$nodes $(n)$ | $(p - k) D_1 D_2 ... D_d$ |
| Ports | $p D_1 D_2 ... D_d$ |
| Density | $p - k$ |
| Paths[3] | $\dfrac{(\Delta_1 + ... + \Delta_d)!}{\Delta_1! ... \Delta_d!}$ |
| Diameter | $D_1 + D_2 + ... + D_d - d$ |
| Bisection bandwidth[4] | $D_1 D_2 ... D_{d-1}$ |
| Scalability | 1 |

1. Table valid when $2d$ divides $k$.
2. $D_j$ is the number of $f$-nodes along the $j^{th}$ side of the grid.
3. $\Delta_x$ is the distance along the $x$-direction between two communicating $f$-nodes.
4. The bisection bandwidth is computed from the product of $d-1$ grid lengths, leaving out the largest grid length. Units are the link, not the number of connections in a link.

FIG. 25

TABLE 8. Topology summary.

| Property | Tree | Clos | Modified Clos | Augmented Clos | Augmented M-Clos | Grid/Torus |
|---|---|---|---|---|---|---|
| pmodules (m) | $\frac{k(a^\ell - 1)}{p - 2k}$ | $\ell(\frac{p}{2})$ | $5(\frac{p}{2})^2$ | $2\ell(\frac{p}{2})^3$ | $10(\frac{p}{2})^5$ | $D_1 D_2 ... D_d$ |
| cnodes (n) | $(p - k)a^{\ell - 1}$ | $2(\frac{p}{2})^2$ | $2(\frac{p}{2})^3$ | $2(\frac{p}{2})^4$ | $2(\frac{p}{2})^6$ | $(p - k)D_1 D_2 ... D_d$ |
| Ports | $pm$ | $2\ell(\frac{p}{2})^2$ | $10(\frac{p}{2})^3$ | $4\ell(\frac{p}{2})^4$ | $20(\frac{p}{2})^6$ | $pD_1 D_2 ... D_d$ |
| Density | $\frac{a^\ell}{a^\ell - 1}(p - 2k)$ | $2\ell(\frac{p}{2})$ | $\frac{p}{5}$ | $\frac{1}{\ell}(\frac{p}{2})$ | $\frac{1}{5}(\frac{p}{2})$ | $p - k$ |
| Bandwidth | $\frac{p - k}{2}$ | $\frac{1}{2}(\ell - 1)(\frac{p}{2})^2$ | $(\frac{p}{2})^3$ | $\frac{1}{2}(\ell - 1)(\frac{p}{2})^4$ | $(\frac{p}{2})^6$ | $D_1 D_2 ... D_{d-1}$ |
| Paths | $k2^{\ell - 2}$ | $(\frac{p}{2})^{\ell - 1}$ | $(\frac{p}{2})^2$ | $(\frac{p}{2})^{2\ell - 2}$ | $(\frac{p}{2})^4$ | $\frac{(\Delta_1 + ... + \Delta_d)!}{(\Delta_1 ! ... \Delta_d !)}$ |
| Diameter | $2\ell - 1$ | $2\ell - 1$ | $2\ell - 1$ | $4\ell - 1$ | $4\ell - 1$ | $D_1 + D_2 + ... + D_d - d$ |

* $\ell$ is the number of levels of $f$-nodes in the topology (which is measured in pod levels for the augmented topologies).
* Bandwidth is the bisection bandwidth of the fabric in units of port bandwidth.
* $a$ is the arity for the tree structure (the number of downward links).
* $p$ is the number of ports for each $p$-module.
* $k$ is the number of links between $f$-nodes.
* $d$ is the dimensionality of the grid or torus and $D_j$ is its extent in the $j^{th}$ dimension. $\Delta_j$ is the distance between nodes along the $j^{th}$ dimension.

FIG. 26

TABLE 9. Numerical values for a fabric built with 32-port modules.

| Property | Tree[1] | Fat Tree | Clos[2] | Modified Clos | Augmented Clos | Augmented M-Clos | Torus[3] |
|---|---|---|---|---|---|---|---|
| pmodules | 2,801 | 367 | 48 | 1,280 | 24,576 | 10,485,760 | 1,000 |
| cnodes | 67,228 | 10,080 | 512 | 8,192 | 131,072 | 33,554,432 | 26,000 |
| Ports | 89,632 | 11,744 | 1,536 | 40,960 | 786,432 | 16,777,216 | 32,000 |
| Density | 24 | 27.5 | 10.7 | 6.4 | 5.3 | 3.2 | 26 |
| Bisection bandwidth | 14 | 16 | 256 | 4,096 | 65,536 | 335,544,320 | 200 |
| Paths | 65,536 | 2,048 | 16 | 256 | 65,536 | 65,536 | 756,756 |
| Diameter | 9 | 9 | 5 | 5 | 11 | 11 | 13 |

1. This tree has 4 connections between $f$-nodes and 5 levels of $f$-nodes.
2. Each Clos fabric has 3 topological levels.
3. The torus is 3-dimensional and has sides 10x10x10 with a single port at each $f$-node for each of the 6 grid directions. The number of paths is for traversing half the grid without wrap-around.

FIG. 27

TABLE 10. Numerical values for a fabric built with 72-port modules.

| Property | Tree[1] | Fat Tree | Clos[2] | Modified Clos | Augmented Clos | Augmented M-Clos | Torus[3] |
|---|---|---|---|---|---|---|---|
| pmodules | 5,220 | 10,102 | 108 | 6,480 | 279,936 | 604,661,760 | 1,000 |
| cnodes | 334,084 | 685,440 | 2,592 | 93,312 | 3,359,232 | 4,353,564,672 | 36,000 |
| Ports | 375,840 | 727,344 | 7,776 | 466,560 | 20,155,392 | 2,176,782,320 | 72,000 |
| Density | 64 | 67.9 | 24 | 14.4 | 12 | 7.2 | 36 |
| Bisection bandwidth | 34 | 36 | 1,296 | 46,656 | 1,679,616 | 43,535,646,720 | 1200 |
| Paths | 4,096 | 3,072 | 36 | 1,296 | 1,679,616 | 1,679,616 | 4,540,536 |
| Diameter | 7 | 9 | 5 | 5 | 11 | 11 | 13 |

1. This tree has 4 connections between $f$-nodes and 4 levels of $f$-nodes.
2. Each Clos fabric has 3 topological levels.
3. The torus is 3-dimensional and has sides 10x10x10 with 6 port at each $f$-node for each of the 6 grid directions.

FIG. 28

FIG. 29A $\quad n = (p - k)\left(\frac{p-k}{k}\right)^{\ell-1}$

FIG. 29B $\quad s_1 = \frac{p-k-1}{p-k}$

FIG. 29C $\quad D = 2\ell - 1$

FIG. 29D $\quad m = \frac{k\left(\left(\frac{p}{k}-1\right)^{\ell-1}\right)}{p-2k}$ FIG. 29E $\quad p = \frac{a^\ell}{a^\ell - 1}(p - 2k)$ FIG. 29F $\quad B = \frac{(p-k)}{2}$ FIG. 30A $$c = pm = \frac{pk\left(\left(\frac{p}{k}-1\right)^{\ell}-1\right)}{p-2k}$$

FIG. 30B $$R = k^{2\ell-2}$$

FIG. 30C $$s_2 = \frac{m-1}{m}$$

FIG. 30D $$r_2 = \frac{(\Delta_x + \Delta_y)!}{\Delta_x!\,\Delta_y!}$$

FIG. 30E $$r_3 = \frac{(\Delta_x + \Delta_y + \Delta_z)!}{\Delta_x!\,\Delta_y!\,\Delta_z!}$$

FIG. 30F $$\{r_{xy}, r_{xy^*}, r_{x^*y}, r_{x^*y^*}\} = \left\{\frac{(\Delta_x + \Delta_y)!}{\Delta_x!\,\Delta_y!}, \frac{(\Delta_x + D_y - \Delta_y)!}{\Delta_x!(D_y - \Delta_y)!}, \frac{(D_x - \Delta_x + \Delta_y)!}{(D_x - \Delta_x)!\,\Delta_y!}, \frac{(D_x - \Delta_x + D_y - \Delta_y)!}{(D_x - \Delta_x)!(D_y - \Delta_y)!}\right\}$$

FIG. 31A  $\quad f = p_1 p_2 \cdots p_\ell$

FIG. 31B  $\quad b_k = p_1 \cdots p_k - p_k$

FIG. 31C  $\quad c_k = p/(p_1 \cdots p_k) = p_{k+1} \cdots p_\ell$

FIG. 31D  $\quad p = b_j c_j + c_{j-1}$

FIG. 31E  $\quad n = b_1 b_2 \cdots b_\ell$

FIG. 31F  $\quad m = 1 + b_1 + b_1 b_2 + \ldots + b_1 b_2 \cdots b_{\ell-1}$

FIG. 31G  $\quad \text{paths} = (c_1 \cdots c_\ell)^2$

DATA DISTRIBUTION PACKET-FLOW INTERCONNECT FABRIC MODULAR MANAGEMENT OPTIMIZED SYSTEM

CROSS-REFERENCE(S) TO RELATED APPLICATION(S)

Referring to the application data sheet filed herewith, this application claims a benefit of priority under 35 U.S.C. 119(e) from both provisional patent application U.S. Ser. No. 61/685,657, filed Mar. 21, 2012 and provisional patent application U.S. Ser. No. 61/622,093, filed Apr. 10, 2012, the entire contents of both of which are hereby expressly incorporated herein by reference for all purposes.

REFERENCE TO APPENDIX

An appendix is included in this application by way of attachment, the totality of which is hereby incorporated by reference for all purposes as an integral part of this application.

FIELD OF THE INVENTION

The invention relates generally to the field of interconnects for computer systems and/or their subsystems as well as networks and/or their subsystems. More particularly, the invention relates to (1) a packet-flow module used to construct (2) packet-flow interconnect fabrics for very large computer systems.

BACKGROUND

Most computer interconnects presently serve a limited number of nodes or endpoints. Larger interconnects are typically built up from packet switches such as Ethernet and Infiniband by joining one interconnect module to another in the form of trees, fat trees, and other networks of switches (known as switched fabrics) configured in a variety of different topologies.

Each switch in such a network may connect to one or more host computers and connect to one or more storage devices. In addition, there may be switch-to-switch connections and switch-to-concentrator connections. The switch-to-switch connections are typically of higher bandwidth than the switch-to-host or switch-to-storage connections to alleviate communication bottlenecks between different hosts. A concentrator, also referred to as a level-2 switch, takes input from one or more switches, forming a bridge between one or more switched fabrics and other devices such as gateways to other packet networks. At a next higher level, such switched fabrics are joined together by a level-3 switch. The flow of data in these implementations must be internally managed by global algorithms as to data paths as well as packing messages for switch-to-switch traffic and unpacking such messages for distribution to individual endpoints (host computers or storage devices).

SUMMARY

There is a need for the following embodiments of the present disclosure. Of course, the present disclosure is not limited to these embodiments.

According to an embodiment of the present disclosure, a process comprises: operating a packet flow module including a plurality of ports, each of the plurality of ports including at least a pair of bidirectional and logically independent communications channels. According to another embodiment of the present disclosure, a machine comprises: a packet flow module including a plurality of ports, each of the plurality of ports including at least a pair of bidirectional and logically independent communications channels.

These, and other, embodiments of the present disclosure will be better appreciated and understood when considered in conjunction with the following description and the accompanying drawings. It should be understood, however, that the following description, while indicating various embodiments of the present disclosure and numerous specific details thereof, is given for the purpose of illustration and does not imply limitation. Many substitutions, modifications, additions and/or rearrangements may be made within the scope of embodiments of the present disclosure, and embodiments of the present disclosure include all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore non-limiting, embodiments illustrated in the drawings. The invention may be better understood by reference to one or more of these drawings in combination with the description presented herein. It should be noted that the features illustrated in the drawings are not necessarily drawn to scale.

FIG. 19 illustrates Table 1.

FIG. 20 illustrates Table 2.
FIG. 21 illustrates Table 3.
FIG. 22 illustrates Table 4.
FIG. 23 illustrates Table 5.
FIG. 24 illustrates Table 6.
FIG. 25 illustrates Table 7.
FIG. 26 illustrates Table 8.
FIG. 27 illustrates Table 9.
FIG. 28 illustrates Table 10.
FIGS. 29A-29F illustrate Equation (1) through Equation (6).
FIGS. 30A-30F illustrate Equation (7) through Equation (12).
FIGS. 31A-31G illustrate Equation (13) through Equation (19).

DETAILED DESCRIPTION

Figure 1:
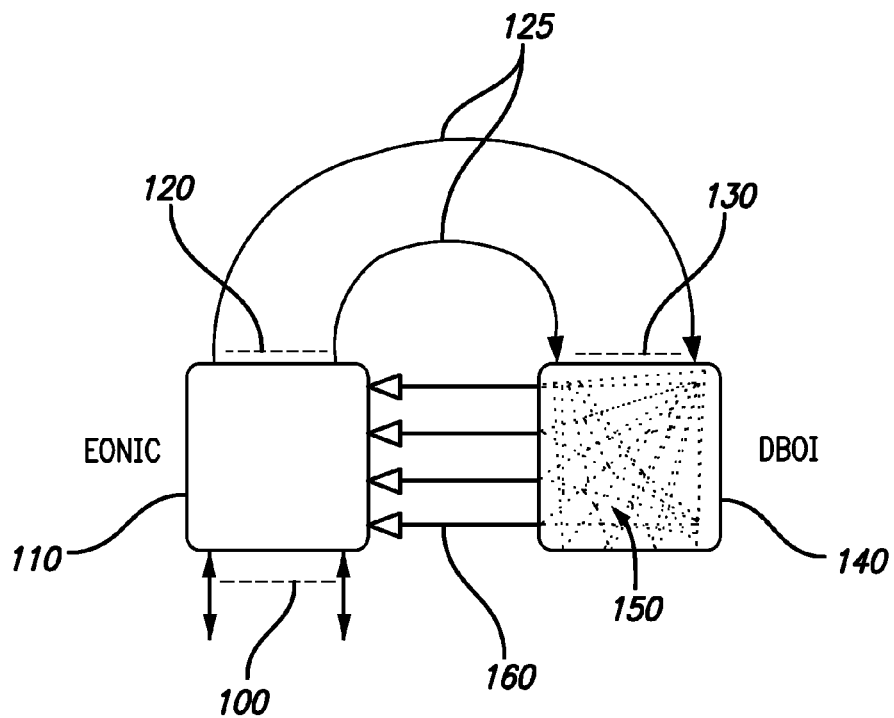
FIG. 1 illustrates a direct broadcast, optical interconnect that fully interconnects n nodes as prior art.

Embodiments presented in the present disclosure and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the embodiments of the present disclosure in detail. It should be understood, however, that the detailed description and the specific examples are given by way of illustration only and not by way of limitation. Various substitutions, modifications, additions and/or rearrangements within the scope of the underlying inventive concept will become apparent to those skilled in the art from this disclosure.

Today's computing clusters as envisioned for data centers, cloud computing, packet-switching systems used in telecommunication, and high-performance computing applications are meant to serve thousands of, and eventually millions of endpoints. The present method of interconnect extensions makes use of various devices to ensure that each node in a many-node system can be connected to any other node, usually in a hierarchical fashion where groups of servers or end nodes are connected with level-1 switches, banks of level-1 switches are connected to level-2 switches, and groups of level-2 switches are connected to level-3 switches. The possibility of any given node-to-node connection is not necessarily permanently established nor may such a connection be established when and as desired. For example, the switches and associated routing hardware within, and the software controlling, these switched networks may become internally blocked by message traffic in competing packet paths. This management requires large routing tables and specialized software for controlling the switch patterns within the fabric and overseeing the global state of the fabric. In addition to packet congestion in a switched network, data must often be passed from switch to switch in the form of discrete hops, making the node-to-node communication take place in a series of stages, where delay and blocking may occur at each stage, while a given message may be required to wait for a switch to open.

It is well known in the field of server farms and other large computer systems that the heterogeneous nature of the diverse hardware elements in such a switched fabric of switches imposes additional complications and costs to building and maintaining a data center, computing or storage cloud, or supercomputer cluster.

The present invention circumvents the need for heterogeneous hardware elements in a switched fabric and eliminates the need for switches altogether in the interconnect fabric. The same invention allows one to construct a single interconnect fabric based on a single, uniform interconnect module to serve multiple endpoints or nodes ranging from thousands, to hundreds of thousands, to millions and far beyond. Between each pair of end nodes, multiple potential data paths are possible and data packets or messages are routed without means of tables, spanning trees, or other fabric-wide control mechanisms.

This disclosure presents a modification of the previously disclosed interconnect (see U.S. Pat. No. 7,970,279, for example) that replaces the host-computer interface (such as PCI express or similar interface devices) with optical connections (in the preferred embodiment) and rearranges the routing logic of the electro-optic network interface controller (EONIC) to accommodate the packet-flow and distribution function from the prior broadcast function.

In the following discussion, "fabric" or "interconnect fabric" is a common term loosely used to refer to a wide range of hardware configurations for interconnecting large numbers of computing nodes and/or storage nodes. As a technical term, "fabric" has become an easy-to-use term often synonymous with "interconnect."

"Architecture" refers to the design of a communications network and includes physical components, functional organization, data formats, and operational procedures. "Topology" refers the pattern of interconnections between the various nodes of a network. Physical topology refers to the configuration of cables and network nodes. Topology is a graph-theoretical concept involving nodes, links, and reachability, while architecture refers to engineering. Often, the two terms are incorrectly used interchangeably.

The "diameter" of an interconnect fabric is the maximum over all pairs of endpoints of the shortest path between any pair. Diameter is a measure of the number of data hops that may be encountered when sending data from one node to another. The "bisection bandwidth" is the number of bidirectional connections that must be severed to separate a fabric into two equal and independent parts. The "reachability" is the number of potential paths (without loops) between any two fabric nodes. There may be a maximum and minimum reachability.

A "pod" is a two-layer, fully connected set of p identical switches or broadcast modules where each module contains p ports and each layer contains p/2 modules.

The invention and the various features and advantageous details thereof are explained more fully with reference to the non-limiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

The here-referenced U.S. Patents disclose embodiments that were satisfactory for the purposes for which they are intended. The entire contents of U.S. Pat. Nos. 7,450,857, 7,630,648, 7,796,885, 7,970,279, and 8,081,876 are hereby expressly incorporated by reference herein for all purposes. In addition, the "pod" concept for switches was developed by Vahdat, et al., and referenced in U.S. Patent Applications U.S. 2010/0020806, published Jan. 28, 2010; U.S. 2007/0276872, published Nov. 29, 2007; and U.S. 2011/0302346, published Dec. 8, 2011. The entire contents of U.S. 2010/0020806, published Jan. 28, 2010; U.S. 2007/0276872, published Nov. 29, 2007; and U.S. 2011/0302346, published Dec. 8, 2011 are hereby expressly incorporated by reference herein for all purposes.

The pod concept is actually a variation on the two-layer neural network developed by Widrow (see "20 Years of Adaptive Neural Networks" by Widrow and Lehr, Proc. IEEE, 78(9), 1990, in particular their FIG. 11 and the following discussion) where routing switches operated externally replace the set of adaptive weights that "learn" through a feedback process. The neural-net learning process is directly analogous to the predetermined routing tables that determine switch positions according to stored patterns; these switch positions are then equivalent to a set of binary neural-network weights (either in the "open" or "closed" state).

Although the topologies of the pod and the two-layer neural network are equivalent and equivalent to that of the packet-flow pod, the latter concept is materially different and easily distinguishable from the switched pod and its two-layer neural-network ancestor by its internal architecture. In the packet-flow pod, data on each input are distributed to and potentially present on each and every pod output, simultaneously. The data packet or message structure contains a header that directs the message to the appropriate output(s) and filters messages from reaching inappropriate outputs.

In general, the context of the invention can include the distribution and gathering of data by means of optical signals, a mix of optical and electrical (digital) signals, as well as purely electrical (digital) signals. The context of the invention can also include the transfer of data by incoherent light and/or coherent light transmissions. The context of the invention can even include the transfer of data by acoustic transmission. The physical context of the invention can include network(s), node(s), circuit board(s) and/or modems, especially for high-speed and high-volume data transfers among and between a plurality of endpoints, computers, computing devices, and/or storage devices.

The invention can include pulse-width modulation and demodulation using precision timing to implement a very high-rate transfer. The invention can include free-space transmissions or coaxial cable or data bus or wires for RF and free-space transmissions or light pipes or optical fibers for light.

The invention can include high speed modulation of a carrier by a bit stream, said modulation optionally taking place in an all digital process. The invention can include high speed demodulation of a carrier to recover a bit stream, said demodulation optionally taking place in an all digital process.

The invention can include an all-digital process to modulate and detect a carrier encoded as described above. If present, the analog portion of the modulator and demodulator are typical phase, frequency, and amplitude devices, well known to practitioners of the art.

The invention can include any of the several topologies of interconnection fabric nodes, where a fabric node is a packet-flow module that is the subject of this invention; or a pod of such packet-flow modules, or pods-of-pods (and so on, recursively) of such packet-flow modules.

FIG. 1 (Prior Art) illustrates the typical n-way (or n-by-n) interconnect based on broadcast light as described most recently in U.S. Pat. No. 7,970,279 ("N-way serial-channel interconnect"). The figure portrays a fully connected, n-by-n interconnect from the inputs (typically from n nodes or endpoints) to the outputs (typically to the same n nodes or endpoints).

Referring to FIG. 1, electrical data on the n inputs 100 (indicated by the heavy, two-way arrows with the continuation dotted line between the two end arrows) from the n host computers are converted into modulated light by lasers (in the preferred embodiment) in the electro-optical, network-interface controller module 110, labeled EONIC. The modulated light exits the EONIC 110 at the n exits 120 (indicated by the dashed line) along n single-mode optical fibers 125 (indicated by the directed arrows with the open heads). These fibers 125 enter the optical module 140 (labeled "DBOI" for direct-broadcast, optical interconnect) at inputs 130 (indicated by the dashed line). Each optical signal is distributed (broadcast) by means of spreading or splitting so that the same signal reaches all portions of the module 140. This broadcast distribution is indicated by the plurality of fan-out and fan-in lines labeled 150, which is meant to represent a continuous spreading or distribution of the light within the distribution cavity of module 140. In the preferred embodiment, these lines 150 schematically indicate the distribution of light broadcast from each of the inputs 130 and collection to each of the output lines 160. The use of "light" in this description is not meant to restrict the invention to optical means as any carrier of information that is capable of being manipulated in the manner indicated by FIG. 1 is valid in the context of the invention. In the optical version of the interconnect, described by the above-referenced patents, the light broadcast from the several inputs is collected by lenses and focused on the outputs 160 which are bundles of multi-mode fibers (indicated by the unidirectional arrows with open heads), each with n individual fibers in the optical case or n individual transmission lines or cables in the electrical case.

Each of the four collection points (the tail of the arrows 160) contains n signals as four replications of the input data stream of the n inputs 130. In the original implementation of the DBOI interconnect, n was 32 and each input stream is split four ways by an optical fan-out device to provide replication of each of the 32 data streams. These optical signals are then combined into four detector arrays or fiber-optic bundles, each containing a copy of the original 32 input data streams. Hence the depiction of 4 data streams 160 exiting the broadcast distribution module 140. These details are explained in the above-referenced patents. This particular example, where n=32 and the optical fan-out of four, was chosen for illustration purposes only. Other choices are possible. For example, a 72-way interconnect might have 9-fold optical or electrical fan-outs leading to 9 output bundles labeled 160 instead of the four depicted in FIG. 1.

Note particularly that there are no switches or routing mechanisms inside either module 110 or module 140. That is, packets are free to flow from any of the n inputs 100, after conversion to optical pulses, to any of the 4n outputs of module 140 without any impediment. Otherwise stated, there can be no data congestion within the assembly represented by FIG. 1.

The four bundles 160 connect to four sets of n optical detectors (contained in module 110 and not shown) where the optical pulses are reconverted to electrical, digital data. In practice, module 110 contains additional means to collect, store, and filter the various digital data streams according to encoded destinations as well as flow-control circuitry needed to resolve potential port contention at the outputs 100 of the EONIC module 110, which signals are electrical signals suitable for transmission along the exit connections of bidirectional links 100. The filtered electrical signals then pass along outputs 100 to the host endpoints. These matters were covered in the above-referenced U.S. Patents, especially U.S. Pat. No. 7,970,279, thus the precise configuration and precise function of the circuitry need not be addressed here.

Figure 2:
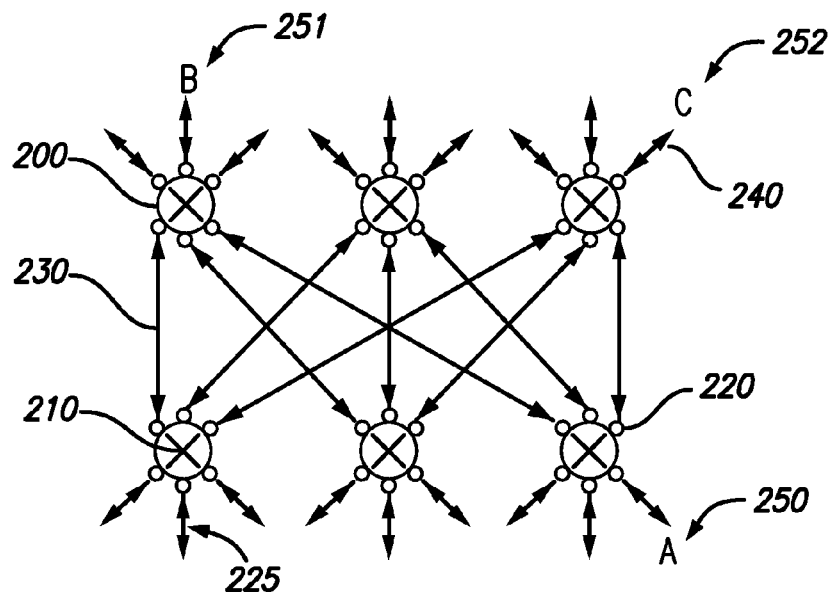
FIG. 2 illustrates a "pod" of interconnect switches as prior art.

FIG. 2 (Prior Art) illustrates a commonly understood method of combining p switches in two fully connected rows of p/2 switches in each row. Each of the p switches has p full-duplex communications ports. In the figure, p=6, so there are two rows of 3 switches in each row. Half of the connections of each p-ported switch are used to fully connect the two rows and half are connections external to the pod, with $p^2/2$ connections serving as inputs to the pod from a lower level in the fabric structure (typically connections to the computing nodes or endpoints) while the remaining $p^2/2$ connections are conceptually termed "outputs" of the pod to the next higher level in the fabric. Of course, the pod is fully symmetric in that it may be turned upside down so that outputs become inputs and vice versa.

Referring to FIG. 2, the six switches 200 each have p full-duplex ports 220, indicated by the small circles (each switch 200 in the figure has p=6 such ports, p/2 or 3 ports shown at the "top" of each switch 200 and 3 ports at the "bottom" of each switch). The illustration is meant to indicate that data pass from the bottom of each switch 200 to the top of each switch 200 for the "forward" or up direction; due to the full-duplex nature of the ports 220 and the switching elements 210, signals may also pass from the top to the bottom in the same manner without having altered the closure pattern of the set of switching elements 210. As described above, each port 220 on the lower half of each switch 200 is connected by switching elements 210 (that are typically externally controlled by global switch patterns in the fabric's routing tables) to one or more of the ports 220 on the top half of each switch 200. The duplex connections 225 (shown as a row of double arrows to indicate full-duplex communications at the bottom of the figure) and duplex connections 240 (shown as a row of double arrows to indicate full-duplex communications at the top of the figure) connect to switches or terminal endpoints (not shown) serving as "inputs" and "outputs" to the pod, which designation being independent of the actual direction of signal movement. Connections 230 (shown as a row of double arrows to indicate full-duplex communications) between the two rows of switches provide the internal connections to create a fully connected, two-layer network as is well-known in the literature of neural nets and interconnects.

Note that a given switch pattern may prevent or block a given signal on any port 220 present on one layer from reaching any chosen port 220 on the other or same layer. In addition, for communications within the same pod, switch patterns may allow a bottom (top)-row port 220 to be connected to another bottom (top)-row port 220 by passing from one row of switches 200 and then returning to the other row without necessarily exiting the pod along any of the duplex channels 225 or 240. A particular instance of switches 210 that accomplishes these patterns may be found in the standard n-by-n crossbar switch, where n=3 in the case illustrated.

As an example of the restrictions imposed by full-duplex switches, consider port 250, labeled A, which may be a port on another switch or an endpoint port. Suppose the switch pattern is such that A is connected to port B, labeled 251, which may be a port on another switch or an endpoint port, and that a message or series of packets is being transmitted from A to B. Should a message simultaneously arise from port 252, labeled C, which may be a port on another switch or an endpoint port, whose destination is the first port A, labeled 250, that message will be blocked until the message from A to B completes. This blockage is due to the duplex nature of switches, and can only be avoided by having two sets of fabric switches, one for each direction of data movement, something that is not normally done.

Figure 3:
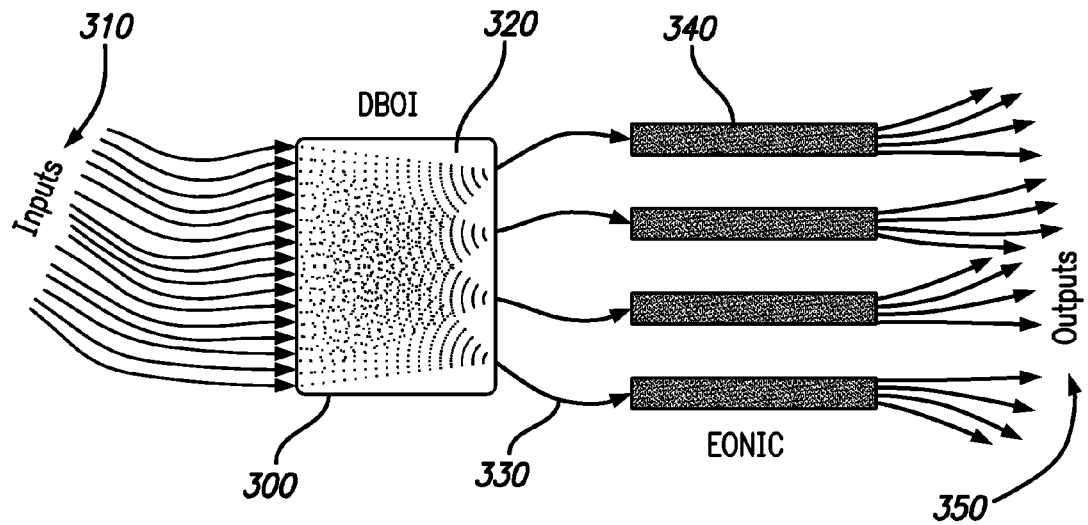
FIG. 3 illustrates the modifications of FIG. 1 to obtain a packet flow-module.

FIG. 3 is a representation of the rearrangement of the configuration shown in FIG. 1, where there are now no electrical connections from or to host endpoints. The configuration is meant to represent optical flow from any input channel to any and all output channels, depending on the dynamic routing of each individual message packet as described above.

Referring to FIG. 3, the n single-mode, optical input fibers 310 (in the preferred embodiment) containing optical signals from other such broadcast distribution modules or, ultimately, from host endpoints following an electrical-to-optical conversion at the appropriate EONIC (such as optical outputs 120 in FIG. 1), are presented to the input side of the optical module 300. The module 300 distributes each of its inputs 310 in a broadcast fashion described above and indicated by lines 320 schematically indicating the broadcast distribution operation. As described above, the distributed optical signals are collected in such a fashion that each of the four physical partitions indicated by multi-mode fibers 330 (in the preferred embodiment), each bundle containing a copy of all n input signals 310. (As mentioned above, this particular illustration uses four partitions, but the invention is not so restricted in its realizations.)

Each separate EONIC module 340 receives n separate optical signals in the fiber-optical bundles 330. These n optical signals are converted to electrical signals by detectors and electronics (not shown, but described in the referenced patents). The electrical signals are then distributed and collected by logic circuits, according the destination headers of the several messages that are now in electronic form (process not shown, but described in the referenced patents). The appropriate electrical data streams are then presented to any or all of n/4 modulators and lasers in each EONIC module 340. The n incoming optical data streams 310 are then distributed among n optical outgoing data streams present on the single-mode output fibers 350.

As above, additional circuitry including intermediate and temporary storage, logic for certain path decisions, and for addressing flow control may be incorporated into any actual implementation without altering the scope or purpose of the present invention or materially changing, even though functionally enhancing, the packet-flow module depicted in FIG. 3.

Note that the optical fibers 310 comprising the inputs to the optical module 300 are independent from the optical fibers 350 comprising the outputs of the EONICs 340. That is, although the ports to the packet-flow module represented in FIG. 3 are p in number, where p here is the same as n in the above description, each port is actually a pair of bidirectional (and logically independent) communications channels. This is to be contrasted to a switch module where each of the pair of p ports are logically tied together in that the pair is switched as a unit (unless, of course, there is a complete switching fabric for each of the directions). It is for this fundamental architectural distinction that the packet-flow module differs markedly in functionality from a switched module.

Figure 4:
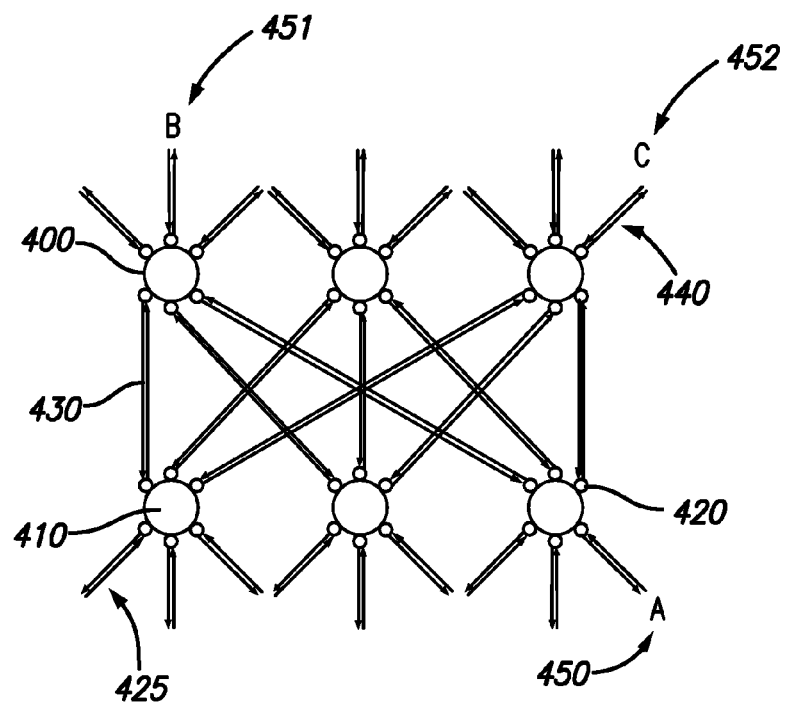
FIG. 4 illustrates the modifications of FIG. 2 to obtain a packet-flow module based pod topology.

FIG. 4 is a representation of the pod topology introduced in FIG. 2, but here it is implemented (architected) with packet-flow modules as presented above. The number of ports was reduced to 6 for clarity; in actuality, the number of ports for each network node represented in FIG. 4 is the number of bidirectional communication pairs of the packet-flow module in FIG. 3. This number is typically 32 or 72 in existing implementations.

Referring to FIG. 4, the six packet-flow modules 400 each have p bidirectional and independent ports 420 as indicated by the small circles. The topology is identical to that of FIG. 2, but the construction and function of the modules and, hence, the pod itself, are quite different. The fully connected, continuous broadcast nature of each module 400 is indicated by the absence of any pattern or symbol in the drawing and indicated by arrow 410 pointing to a void internal portion of each module 400. Optical signals (in the preferred embodiment) flowing to the pod via the ports 420 at the top of the top row or the bottom of the bottom row of modules 400 via any of the bidirectional lines 425 or 440, as indicated by the arrows with open heads directed toward the pod, are present simultaneously (in principle if not actually, depending on the headers of the messages entering the pod) on each of the other ports 420 at the top of the top row or the bottom of the bottom row of modules 400. Such signals then may leave the pod (again, depending on the headers of the messages entering the pod) along any of the bidirectional lines 425 or 440, as indicated by the arrows with open heads directed away from the pod.

As in FIG. 2 above, the topology demands a fully interconnected, two-layer system whose connections are made by bidirectional lines 430, represented by pairs of arrows in opposite directions, also with open heads.

Note, in particular, that there are no global patterns of switch settings needed for this packet-flow pod to distribute signals from any of its entrance ports 420 to any of its exit ports 420. Note, also, that a virtual connection from any pair of ports along the top or bottom row of the pod or along the top or bottom row of modules comprising the pod does not require a virtual connection in the reverse direction. That is, the bidirectional nature of the ports and the broadcast distribution mechanism means that packet-flow paths are independent and that this independence means that the full bandwidth of the pod as well as any fabrics constructed with such packet-flow modules or packet-flow pods is potentially available.

As an example of the versatility of the bidirectional ports, consider port 450, labeled A, which may be a port on another pod or an endpoint port and suppose that port 450 is in the process of relaying a message or series of packets to port 451, labeled B, which may be a port on another pod or an endpoint port. Should port 452, labeled C, which may be a port on another pod or an endpoint port, need to relay a message to port 450, such transmission is not blocked by the message from A to B; that is, any given port may transmit data to one or more ports, simultaneously while receiving data from a different port.

Contrast this behavior to the case of switched modules or pods where approximately half of the bandwidth has no practical use given the full-duplex nature of the switches.

Figure 5:
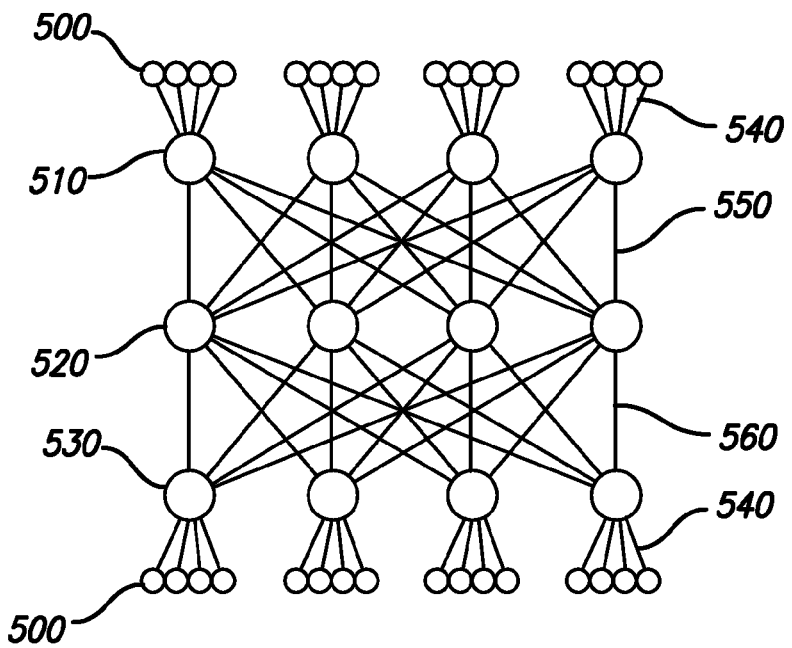
FIG. 5 illustrates a Clos network based on the packet-flow module.

FIG. 5 is a representation of a symmetric Clos fabric (Charles Clos, "A study of non-blocking switching networks," Bell System Technical Journal 32(2), pp. 406-424, 1953) where the number of input ports per input (bottom row) module is equal to the number of modules in each of the three rows and the number of output ports per output (top row) is likewise equal to the number of modules in each of the three rows. In the instance illustrated in FIG. 5, the connections between packet-flow modules and endpoints are bidirectional, meaning that the endpoints at the bottom are different from those at the top, effectively doubling the number of endpoints served.

Referring to FIG. 5, the several endpoints 500 are represented by small circles at the top and bottom rows of the figure. Fabric nodes 510, 520, and 530 are packet-flow modules as shown in FIG. 3; here each packed-flow module in the fabric represented by FIG. 5 has p=8 bidirectional ports. Row of nodes 510 has p/2, or 4 in this example, bidirectional connections 540 to 16 endpoints 500 and p/2 bidirectional connections 550 to the middle row of nodes 520. The middle row of packet-flow modules 520 also each have p/2 bidirectional connections to the bottom row of packet-flow modules 530, which also each have p/2 ports with p/2 bidirectional connections 540 to the bottom row of endpoints 500. In this way, a fully saturated set of 3 p packet-flow modules provides a fully interconnected, non-blocking fabric for $(p/2)^2$ endpoints, or 32 endpoints in the illustration. It is possible to increase the number of middle rows beyond the single row 520. This augmentation allows for greater path redundancy between any two endpoints. ("Saturation" as used here means that all ports have connections.)

Let L be the number of rows or levels in the symmetric Clos topology, an analysis shows that the number of endpoints served by this topology is $(p/2)^2$ and requires L (p/2) packet-flow modules, so there are p/(2 L) endpoints for each packet-flow module; this is not a particularly efficient architecture in terms of fabric hardware, but it serves as background for the next figure.

Figure 6:
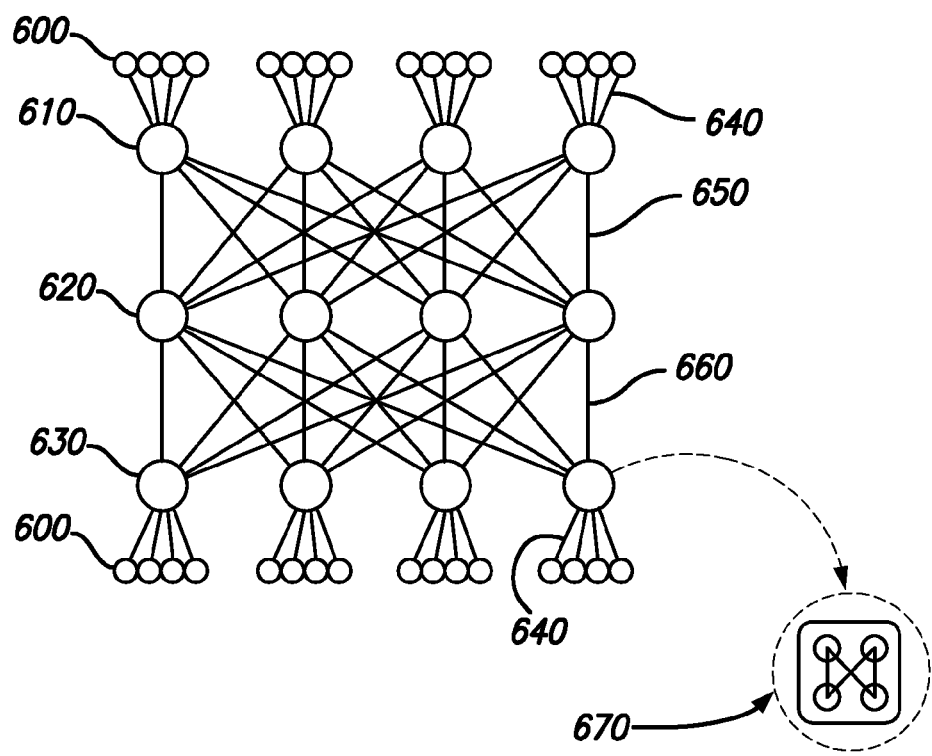
FIG. 6 illustrates a Clos network based on pods of packet-flow modules.

FIG. 6 is a representation of a symmetric Clos fabric constructed from pods of packet-flow modules. The only difference from FIG. 5 is the architecture of the fabric, which is based on packet-flow pods of $p^2/2$ ports each instead of packet-flow modules of p ports each. (Here, and elsewhere in this disclosure, p is the number of ports in the packet-flow modules used to construct the interconnect fabric.)

Referring to FIG. 6, the topology is identical with that of FIG. 5, but the number of ports per packet-flow module is now p=4 in this example instead of the p=8 used in FIG. 5. The elements in the drawing have the same function as above, with end nodes 600, and packet-flow modules in three rows, 610, 620, and 630. The bidirectional connections between endpoints 600 and the outer rows of fabric nodes 610 and 630 are indicated by lines 640. The bidirectional connections between the middle row 620 and the two outer rows 610 and 630 are indicated by lines 650 and 660, respectively.

An analysis shows that the number of endpoints served by this topology is $(p/2)^4$ and requires 2 L $(p/2)^3$ packet-flow modules. Thus, a small number of ports, p, per packet-flow module may serve a very large number of endpoints (some 65,536 endpoints for p=32 and 1,679,616 endpoints for p=72).

Each packet-flow module 610, 620, and 630 is, in this figure, a packet-flow pod represented by the bubble 670, which contains four each 4-port packet-flow modules comprising a pod with 8 ports.

The purpose of these two illustrations is to show the power of the packet-flow pod concept when constructing interconnect fabrics for large numbers of endpoints.

Figure 7:
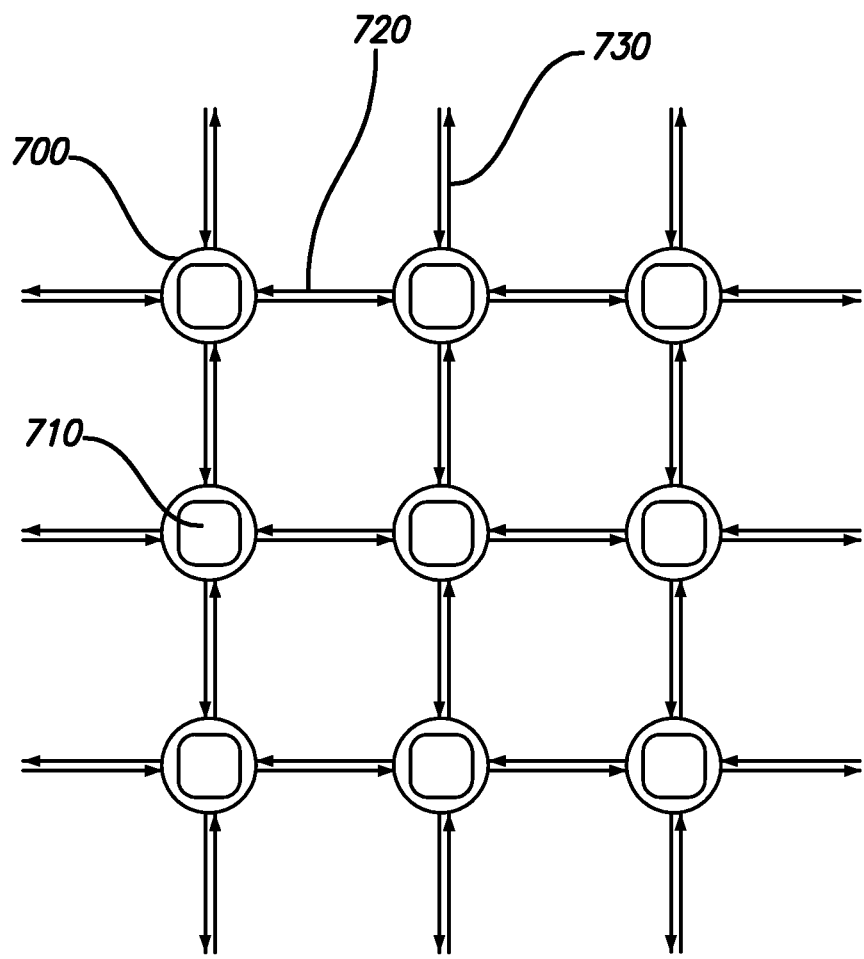
FIG. 7 illustrates a regular grid network based on packet-flow modules or pods of packet-flow modules.
Figure 8:
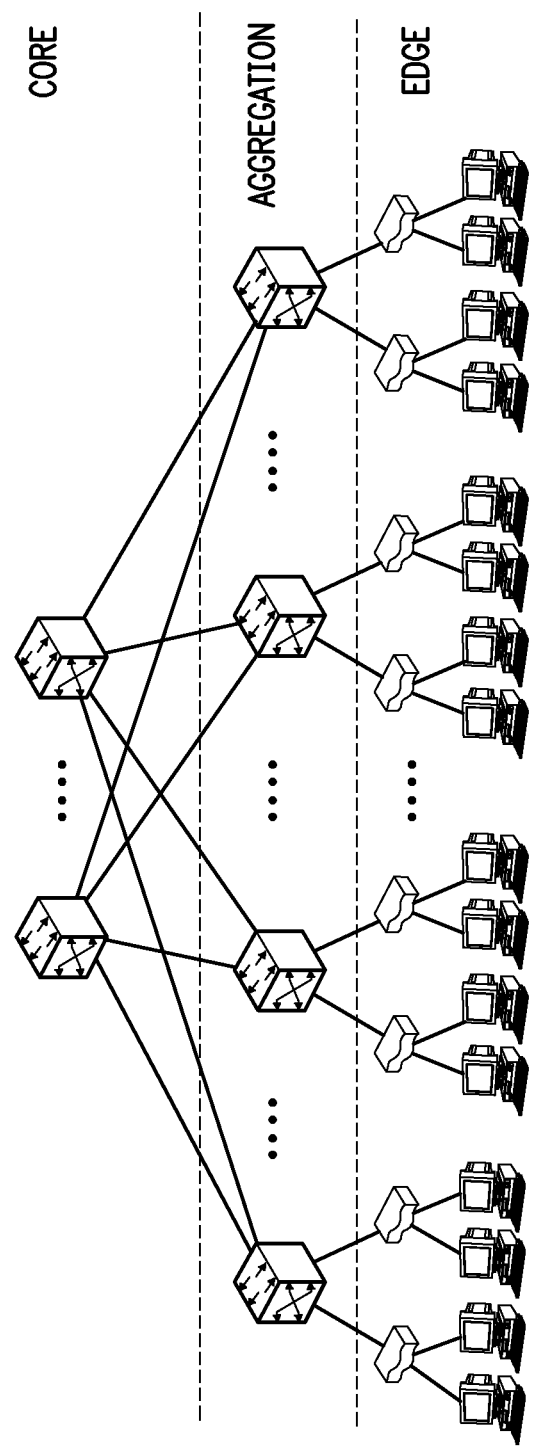
FIG. 8 illustrates three switching layers, arranged as a 3-level tree.

FIG. 7 is a representation of a two-dimensional, regular-grid fabric with packet-flow modules, or pods of packet-flow modules, as the fabric nodes.

Referring to FIG. 7, nine packet-flow modules 700 are shown arranged in a regular grid of 3 on a side. Four bidirectional connections 720 are made from each module 700 to its 4 nearest neighbors. Supposing each packet-flow modules has p bidirectional ports, then (p−4) endpoint ports 710 remain at each fabric node (also indicated by 700) for bidirectional connections to endpoints (e.g., computing nodes, servers, storage nodes, etc.). Bidirectional connections 730 point out from the grid array are used to (1) attach more modules 700 in the form or rows or columns (in the two-dimensional case) or (2) to transform the open-grid topology into a torus topology. Increasing the number of fabric nodes 700 also increases the fabric diameter (the farthest hop distance between any two fabric nodes) and hence the maximum network message latency.

A variation on the above-described architecture would be to devote double or triple (or more) of the bidirectional connections 720 and 730 to the node-to-node communications and correspondingly less to the end nodes 710. Thus, the internode bandwidth can be increased as desired.

Note that higher dimensions of the regular grid fabric are also possible. For example, Cray's Gemini interconnect and Fujitsu's Tofu interconnect are both three-dimensional grids with wrap-around connections forming a three-dimensional torus. The toroidal configuration doubles the bisection bandwidth and halves the network diameter while greatly increasing the number of potential paths between any two fabric nodes.

Of course, any packet-flow node 700 may be replaced with a pod of packet-flow modules (as suggested in FIG. 6). This pod expansion produces a packet-flow fabric with any desired bandwidth and any desired number of endpoints per fabric node.

The topologies presented in FIGS. 5, 6, and 7, and by implication other such topologies that might be useful in large data centers (such as the tree, fat tree, torus, and the Clos/fat-tree introduced by Vahdat) are not novel. Also, extending any of these topologies using the pod concept, although novel and explicitly presented here for the first time, cannot be claimed to be unexpected given the work by Vahdat, et al., cited above. However, the architecture of any and all of these topologies, implemented with packet-flow modules, as described above, or by pods of such packet-flow modules, is certainly both novel and not anticipated by, nor derivable from, past work on switched fabrics or switched interconnects. That is, the packet-flow fabrics presented above, and by implication, any packet-flow fabric based on any other topology, represents an innovation that was not previously possible without the conversion of the direct-broadcast, optical interconnect into a packet-flow module of a different and unique internal architecture.

The reasons for this assertion are twofold: (1) the bidirectional nature of the packet-flow modules and the (2) large number of potential endpoints served by these interconnects. While switched fabrics can obviously be extended in the manner described above, and switches of 48 or higher ports can be architected to serve millions of computing nodes, the overt and top-down management of such large fabrics becomes a difficult, if not impossible, task. It is well-known that the construction and pruning of routing tables involves an unstable algorithm and that present-day work-arounds make use of compromises that make for unsatisfactory solutions for creating, maintaining, searching, and sharing the very large routing tables needed.

A key advantage of the present invention is that, by eliminating switches in the fabric, complex routing schemes are no longer required. Message routing becomes a locally determined process, within each fabric node, without the need for global, top-down fabric control and monitoring.

Another advantage of the present invention is that the full fabric bandwidth is now available whereas approximately 50% of this bandwidth is effectively blocked in switched fabrics due to the nature of the full-duplex ports and connections.

Further Details on Interconnects for Large Computer Systems

This portion of the instant disclosure explores issues in extending the Lightfleet direct-broadcast interconnect for addressing large numbers of endpoints. In particular, connectivity issues in cloud computing, server farms, supercomputing, storage farms, and telecommunication installations are discussed. The several approaches presently in use are compared and contrasted to similar methods enabled by the Lightfleet interconnect.

The central issue in addressing large systems of endpoints, which may be servers, high-performance computing nodes, storage nodes, gateways, or communication points, is that of scalability: can the interconnect easily be extended to include more nodes? Typical commodity interconnects are based on switches that have a limited number of connection ports, so the issue of (horizontal) scalability becomes that of interconnecting large numbers of port-limited modules. Certain topologies (configurations of nodes) are in common use with the most frequent ones being mesh, star, and tree. Hybrid versions are also in use (a tree of meshes, for example).

The first section, following an introduction, discusses issues of network topology, showing that different topologies have different strengths and weaknesses; the trade-offs are usually between scalability, bandwidth between nodes, number of nodes serviced, network diameter (a measure of the path distance between nodes), and reachability or path redundancy (the number available paths between two nodes). Two key parameters are diameter (which determines the latency between nodes) and bandwidth. Trade-offs between diameter and bandwidth or diameter and scalability are assessed. The goal of the first part of this paper is so show how to select a fabric topology based on identical fabric modules.

The second section is concerned with fabric management and contrasts the control of packet traffic in a switched system with that possible in packet-flow system that is based on a modification to the Lightfleet interconnect. This new method of packet routing operates across interconnects at all scales, from the small enterprise of a few hundred servers to very large server farms and packet routing systems with millions of nodes. The routing methods suggested avoid problems of scale that are endemic to switched fabrics. The analogy being that of unscheduled and locally controlled automobile traffic compared to railroad or airline traffic that requires global management of the entire system.

Introduction

Background

Lightfleet Corporation has invented, patented, and developed a novel interconnect fabric that provides tight coupling between computing nodes. The basic invention allows up to 128 computing nodes (c-nodes or endpoints) and beyond to be fully interconnected without possibility of in-fabric congestion. That is, all paths between c-nodes are strictly non-blocking and each endpoint may broadcast to all other endpoints simultaneously without the need for software control of path routing.

The portion of the instant disclosure, Properties of Lightfleet's Direct Broadcast Optical Interconnect, referred to as DBOI, discusses the properties of such an interconnect fabric, showing that the Lightfleet device is optimal in the eight basic interconnect properties (bandwidth, degree, diameter, latency, capacity, congestion, data skew, and path freedom). Since the DBOI is strictly non-blocking, it has no in-fabric congestion so its behavior under Amdahl's law of scalability with additive communications overhead is nearly ideal.

The portion of the instant disclosure DBOI Performance Characteristics discusses additional characteristics of the interconnect fabric, demonstrating both the functional advantage of the interconnect and discussing its competitive advantage even under advancing communications technology. The topics of bit rate, broadcast, and how response-time variance of messages within a DBOI system are improved are all covered. In addition, several programming models are presented.

The purpose of the present portion of the instant disclosure is to show how the basic DBOI may be used to interconnect thousands to millions of endpoints while retaining many of essential ideal properties that make this such an effective solution for tight clusters. The basic idea is to form a network of DBOI modules, where each DBOI module may serve both as a node in the network fabric (or f-node) while, at the same time, function as broadcast interconnect for a tight cluster of computing nodes or endpoints (c-nodes), logically residing at each f-node. This has certain similarities to the way data centers are presently architectured.

While the broadcast capability is maintained, the fabric diameter will increase beyond the ideal of one unit, meaning that the message latency between two arbitrary c-nodes will increase when messages travel between f-nodes. However, as will be shown below, many desirable properties of the resulting fabric of DBOI f-nodes are retained. The advantages of a network of DBOIs over that of a network of switched interconnects (known as a switched fabric) are discussed as well. A DBOI fabric constructed in this manner may be termed a data- or packet-flow fabric to distinguish it from the ubiquitous switched fabric.

"Fabric" or "interconnect fabric" is a common term loosely used to refer to a wide range of hardware configurations for interconnecting large numbers of computing nodes and/or storage nodes. As a technical term, "fabric" has become an easy-to-use term often synonymous with "interconnect."

Problem Statement

Main Issues: Scalability & Management

Data centers (server farms, storage farms, "cloud" computing installations) as well as HPC or high-performance computing (scientific, research, government applications), enterprise computing (large systems dedicated to specific business applications such as databases, automation, order processing, scheduling, accounting, and information management), and large-scale packet-switching systems used in telecommunications are all experiencing a push to harness ever increasing numbers of computing resources under a single, uniform means of coherently accessing and controlling the entire set of computing resources available to a given installation. For example, data-center needs are presently surpassing the 100,000 server mark as are the more specialized HPC installations. While enterprise installations have not yet reached these large numbers, their needs are growing too, and are often limited by installation cost rather than by a lack of desire for expanded computational resources.

Research based on commodity switches (e.g., Ethernet based hardware) and commercially available InfiniBand switches is attempting to deal with the issues of effectively and inexpensively integrating very large numbers of computing resources into coherent systems. Most of the effort expended by research laboratories (e.g., commercial enterprises involved in data centers and cloud computing) is focused primarily on expanding the capability of switched fabrics using software innovations while, at the same time, proposing new networking topologies and architectures. For example, InfiniBand and Ethernet switches beyond about 36 or 48 ports are based on the three-layer Clos network that is discussed below. In spite of what many vendors claim, this structure is actually blocking under certain easily found traffic patterns.

The main issues involved in extending present-day interconnect fabrics from tens-of-thousands of servers to hundreds-of-thousands center around scalability (in bandwidth and number of nodes served), interconnect management (software and hardware needed for routing, spanning-tree maintenance, control and monitoring the state of the fabric), and difficult or inflexible communications protocols, among others. Even with high-end switches and routers that increase bandwidth capacity to "aggregation" and "core" levels, the best topologies support only a fraction of the aggregate bandwidth found at the c-node or "edge" level. The resulting non-uniform bandwidth available in the fabric limits system performance and complicates software management at the user level. In addition, each level of switching or routing typically requires its own control and supervising software, which can grow in complexity with level due to maintaining ever larger routing tables to minimize routing conflicts. This further compounds software-management issues.

"Scalability" is used in both the "horizontal" or "out" sense as well as in the "vertical" or "up" sense and has no fixed or precise definition even though the term is in frequent use. Horizontal scaling implies adding more computing nodes; vertical scaling simply means adding more capability to an existing node. Sometimes scalability in a data center is defined merely as the possibility that any host may communicate with any other at its full port bandwidth. In somewhat more precise terms, a scalable system is one whose performance improves in proportion to added hardware. In a quantitative use of the term, scalability may indicate how the number of c-nodes grows with increasing number off-node ports. The term "extensibility" often denotes this latter use of scalability.

The main issues in meeting the demands of today's data centers are then

How to scale beyond a few thousand c-nodes to hundreds of thousands or millions, and How to effectively manage such a large system.

Secondary Issues: Latency, Bandwidth, and Reachability

Other issues affecting effective and efficient integration of large systems involve latency and path reachability (the number of potentially available paths over which two endpoints may communicate) and redundancy (available hardware in case of failure) as well as horizontal and vertical scalability. For many applications, latency is not as important as bandwidth between nodes as latency is often predictable from routing tables or from the known distance in a tree or other node structure between the two communicating endpoints.

While these issues have been satisfactorily addressed in small to medium-sized installations, for next-generation installations, when the fabrics and management thereof extend to millions of c-nodes, satisfying these constraints often appears intractable with few or no satisfactory solutions available. It is the goal of this portion of the instant disclosure to show how simple and affordable solutions may be achieved by viewing the problem from the standpoint of a packet-flow fabric based on the DBOI interconnect.

In a switched architecture, reachability is not as important as latency or bandwidth for the simple reason that exploiting high reachability increases the probability of congestion. When a topology provides high reachability, the set of potential path choices is often pruned to a manageable number by software, resulting in sub-optimal spanning trees with fewer routes than are structurally possible.

For high-performance computing (HPC), bandwidth is often the overriding issue, with latency playing a secondary role. This is evident from the interconnect topologies listed on the Top500.org site. The top-performing HPCs have a 3D toroidal topology, which has excellent reachability and bandwidth, but poor topological latency when compared to tree structures. (The poor topological latency may often be improved by architectural choices involving high-speed circuits and various dynamic, algorithmic routing means to improve total message latency, usually at the expense of additional hardware and software.)

High reachability, while providing path redundancy and a basis for maintaining communications between c-nodes should an f-node fail, might be too much of a good thing. Routing tables should reflect the best paths so that a choice assuring efficient delivery can be made. For high reachability, sizes of such tables can grow to consume large amounts of memory and increase search time for a good path, thus increasing message latency. A common solution is to prune the tables down to manageable size, effectively reducing the reachability. In addition, a the switches used in today's interconnects usually have specialized hardware to detect and control congestion. Such management hardware beyond the simple switching functions is often supplemented by a control plane that shadows the data plane.

In a switchless fabric without routing tables, there are several ways to exploit reachability: simply broadcast on all possible forward paths as each node is reached, or direct messages to the nearest non-busy f-node. On a grid or 3D torus, the optimal path is the shortest Manhattan distance between nodes. For other topologies, there are likewise simple, local algorithms to achieve efficient packet-flow routing.

Data Center Example

A data-center interconnect typically consists of a network of switching and routing modules (referred to as f-nodes above) arranged in a two- or three-layer tree with the servers or computing nodes as leaves. A common approach is for a rack of servers to be interconnected with a multiport "top-of-rack" (TOR) switch. In a common configuration, the rack contains 40 servers and the TOR switch has 48 ports, 8 of which connect to a Layer-2 switch. Racks are arranged in rows, where the "end-of-row" (EOR) switch concatenates traffic from the TOR switches. The EOR switch often has 96 or 128 ports. Multiple rows feed the Layer-3 switch, often referred to as the "core" switch, which may have up to 288 ports (typically consisting of three layers of 24-port crosspoint switches with 12 switches in each row). Note that each layer of the tree experiences a bandwidth bottleneck, so that rack-to-rack communication is limited by the bandwidth of the Layer-2 and Layer-3 switches. In addition, this topology requires progressively more specialized and expensive switch modules at each higher layer in the tree.

Figure 15:
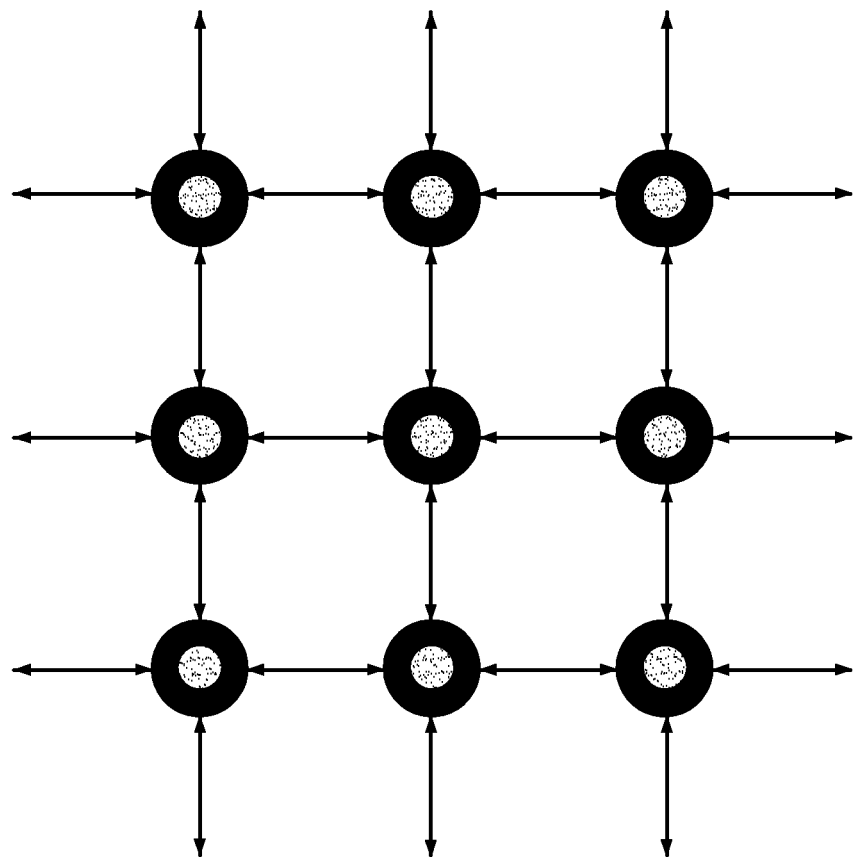
FIG. 15 illustrates a mesh interconnect spaced on a regular two-dimensional grid.

A structure similar to this one is presented as an example by Al-Fares, et al.[1] where an interconnect consisting of 24 rows of 12 racks each for a data center with 11,520 servers is described. FIG. 15 reproduces the example given in Ref. 1 as a "common data center interconnect topology." This represents a simplification over actual data-center use in that each edge switch today supports around 40 servers as described in the preceding paragraph.

FIG. 15 illustrates three switching layers, arranged as a 3-level tree. Host-to-switch links (green) are gigabit Ethernet while links between switches (red) are 10 gigabit Ethernet.

While the tree structure provides good latency (proportional to the logarithm of the number of levels), the bandwidth between levels actually decreases, leading to a lack of bandwidth scalability (that is, if there are 40 servers as in the above example, there are only 8 equivalent links to the next level in the tree). In addition, the management complexity increases with level, with ever larger routing tables being required. Even though the output layer of the several switches typically employs data concentrators and uses higher-bandwidth ports, the bandwidth at the top level is a small fraction of the total bandwidth to the endpoints or leaves of the tree. While this is true of many interconnect topologies, switched or otherwise, a tree structure is perhaps the worst offender at diminishing bandwidth as node-to-node distance increases. The use of fat trees (below) alleviates the bandwidth problem but does not cure it. The above example illustrates the trade-off between bandwidth and latency, which is primarily a result of the network topology and not the particular architecture (hardware).

"Architecture" refers to the design of a communications network and includes physical components, functional organization, data formats, and operational procedures. "Topology" refers the pattern of interconnections between the various nodes of a network. Physical topology refers to the configuration of cables and network nodes. Topology is a graph-theoretical concept involving nodes, links, and reachability, while architecture refers to engineering. Often, the two terms are used interchangeably.

High Performance Computing Example

An approach often found in high-performance computers (HPCs) or supercomputers is to use a regular grid of f-nodes where each f-node is connected to its nearest neighbors. Often the f-node is incorporated into the host itself or is a part of the host channel adapter (HCA). Both Cray's Gemini [2] and Fujitsu's Tofu[3] make use of a three-dimensional torus, which is a grid of f-nodes where each f-node is connected to its nearest neighbors in the east and west directions, the north and south directions, and in the up and down directions. That is, each f-node has 6 bidirectional or duplex connections, each of which may carry multiple data channels to enhance the bandwidth. To form a torus, the f-nodes at the top surface (up direction) of the 3D grid are wrapped around to connect to the corresponding f-nodes on the bottom (down direction); similarly with the other faces of the structure.

Traffic in a regular grid or torus off-nodes is routed, often by switches as in an InfiniBand-based torus. Typically, data flow from f-node to f-node in an efficient manner, arriving at the specified destination after making the required number of node hops. Fabric diameter, and hence message latency, is approximately proportional to the cube root (in a 3D fabric) of the number of c-nodes.

In high-performance computing, the architecture often consists of proprietary hardware for the communication connections between f-nodes and connections from f-nodes to c-nodes. In spite of superior bandwidth performance, such solutions are simply too expensive for use in data centers and cloud computing as they are often designed for specific machines rather than for a broad commercial market.

Today's Solutions

Solutions to these central issues encountered by increasing data-center size are currently being explored in hopes of finding a satisfactory answer to the particular problems of scalability and fabric management given the constraints of low latency and high bandwidth. Work has been done in the area of "scalable Ethernet" architectures[4] and in extending InfiniBand to ever larger systems. Some of the major players such as Cisco and Hewlett-Packard are hoping to extend their proprietary InfiniBand products to cope with the demands of large data centers even though InfiniBand has inherent problems of its own.

Apart from the HPC approach, it appears that the industry has largely determined that any solution should involve existing hardware based on InfiniBand or Ethernet, thus most of the effort has gone into software work-arounds to overcome the problems of managing a large fabric of switches. It is evident from Ref. 1 and other papers mentioned below that the bulk of current effort is focused on getting Ethernet into large data centers. As an example, a recent issue of The Internet Protocol Journal discusses some specific advances in Ethernet routing that is ostensibly aimed towards the cloud, where it "allows a fairly large Layer 2 cloud to be created, with a flat address space."[5]

This hope placed on commodity hardware is to be expected given the widespread familiarity with Ethernet and its protocols as well as the "commodity" nature of Ethernet devices and modules. It is the position of this portion of the instant disclosure that these familiar solutions have been pushed beyond a reasonable limit and it is hoped that the following material will pave the way for a simpler and less expensive solution to the central problems while meeting the constraints of latency, reachability, and bandwidth.

Due to the highly efficient VLSI designs, today's Ethernet and InfiniBand switches are based on the simple crossover (crossbar, crosspoint) or matrix of switching elements. Such a switch connecting n points has $n^2$ switching elements connecting n input lines with n output lines and thus has problems scaling to large n. Any input line may be connected to any single one or none of the output lines. Such a switch is strictly non-blocking since no path interferes with any other path. Switch modules typically surround the crossbar by input-channel buffers, output-channel buffers, routing and port-arbitration logic. Totality is controlled by a separate management module for congestion identification, flow control, and other management functions.

Legacy Approach

Since most switched interconnect modules were originally designed to serve a limited number of c-nodes, constructing larger networks by means of f-nodes from these devices generally involves compromises between latency, bandwidth, scalability, hardware cost, and software management. Larger interconnects are typically built up from smaller interconnect modules by joining one module to another in the form of networks of switches that may be configured in a variety of different topologies. The most common configuration is that of an unstructured mesh of switches that serve a heterogeneous mixture of storage nodes, computing nodes, and gateways to other such networks. The unstructured mesh is neither an efficient configuration of f-nodes nor does it make for an easily manageable network for large numbers of c-nodes.

Each switch in such a network may connect to one or more host computers and connect to one or more storage devices. In addition, there may be switch-to-switch connections and switch-to-concentrator connections. The switch-to-switch connections are typically of higher bandwidth than the switch-to-host or switch-to-storage connections. A concentrator, often incorporated into a higher-level switch, takes input from one or more switches, with provision for a bridge between one or more switched fabrics and other devices such as gateways to other data networks. The transmission of data through these systems must be internally managed as to destination, taking account of existing traffic. At the higher levels in a tree, for example, messages must be packaged for switch-to-switch traffic at higher bandwidths and unpacked for distribution to individual endpoints (host computers or storage devices).

As noted above, researchers are attempting to address the interconnect problem with commodity switches, particularly of the InfiniBand and Ethernet varieties. Their stated goals are usually "scalable, easily manageable, fault-tolerant, and efficient" as well as cost-effective data centers. One solution to these problems seems to lie with choice of topology. However, certain topologies, while effective at serving large numbers of c-nodes, lead to increased difficulty in fabric management in the form of larger a larger routing information base (RIB), increased software sophistication, or additional management traffic that impacts system performance.

Supercomputer installations generally favor a planned interconnect that adheres to one of these classes. Data centers, on the other hand, often consist of an heterogeneous mixture of interconnects that are joined by specialty switches and extended by gateways. Both the interconnects and the gateways are connected in unstructured meshes with the purpose of allowing for expansion of the number of c-nodes without a redesign of the architecture or a reconfiguration of the nodes into larger networks. This unplanned organic growth leads to data skew (arrival uncertainty) during broadcast, unpredictable and large latency, and congested networks that lose messages, requiring retransmission resulting in a degradation of system performance.

Bandwidth-centric or latency-centric networks,—which is more important? This is a central question in network design. Node bandwidth is an architectural issue and is often a matter of increasing hardware resources for a given node, for example, in using higher-bandwidth components or duplicating the communications channels by duplicating each f-node in the fabric. The network-diameter contribution to latency always depends on physical topology. For example, latency grows as $m^{(1/3)}$ for a 3-dimensional mesh but only as log m for a tree structure, where m is the number of f-nodes.

Critique of Today's Solutions

Difficulties with present-day attempts to master the problems posed by the large data center stem from the use of switches, whether they be Ethernet, InfiniBand, or proprietary. While new fabric topologies are addressing some of these issues, the use of switches still brings about severe problems associated with the top-down routing of messages within the fabric. Past fabric-management solutions are often not scalable to large numbers of endpoints as shown by the special effort that one must employ.

Today's solutions fail to address the following three areas: Heterogeneous hardware, with an hierarchy of increasingly complex and costly switches, Congestion at each level of switching in addition to port contention, and Need for spanning-tree algorithms and distributed routing tables to attain useful performance.

The newer topologies, while solving the scalability problem and the heterogeneity issues, underscore the problems of fabric management when extended to very large numbers of c-nodes. The use of spanning trees and routing tables becomes cumbersome even for relatively small installations; for the larger installations, fabric-management problems under the constraints of large reachability and low latency may well be intractable.

The following section on Network Topologies should clarify some of these issues and, given the packet-flow nature of the switchless DBOI f-nodes, point toward a satisfactory solution to these difficulties while meeting the important constraints.

Network Topologies

Introduction

While there are a large number of possible network topologies based on a common classification[6], this portion of the instant disclosure will concentrate on a few of the topologies most commonly found in server farms, cloud computing, and high-performance computing. Specifically, the topologies considered will be variations on tree structures, regular mesh and torus structures, and modifications of the 1953 Clos network[7].

The underlying architecture of these various interconnects is based on a network of switch modules, where a switch module is typically a commercially available multiport device such as an Ethernet[8] or InfiniBand[9] switch. Except for a few illustrations of examples found in the literature, where heterogeneous modules are used, most of the examples below will consider a uniform architecture where all f-nodes are interchangeable, consisting of equivalent hardware modules with identical functionality. The reason for this is simplicity and cost-effectiveness of the installation as well as of ease of fabric management and maintenance.

The main purpose of this portion of the instant disclosure is to show how to base the interconnect architecture on the DBOI modules introduced above and present the advantages of the DBOI over Ethernet, InfiniBand, and proprietary solutions. To avoid the high cost and extra complications of an heterogeneous architecture, the fabrics discussed will have identical f-nodes.

That is, the architectures of interest will all be based on interchangeable modular structures of uniform design and functionality.

Selected Topologies

The criterion for selecting which fabrics to analyze in the following sections depends on two factors Fabric homogeneity, and Simplicity of topology.

Fabric homogeneity means that the architecture is uniform in that the same f-nodes and connections between f-nodes are used throughout the fabric. This is in stark contrast to the architecture described above under FIG. 15. Simplicity of topology means mixed topologies such as fabrics joined by gateways are to be avoided. By adhering to these two criteria, the resulting fabrics will be simpler to analyze and easier and less expensive to build and maintain.

Tree Topology

The simple tree topology is one of the best choices in terms of diameter and scalability. For n leaves or c-nodes, the number of levels is proportional to log n. For the tree shown in FIG. 9, with two links downward for each node, the number of levels is $\log_2 n$.

Figure 9:
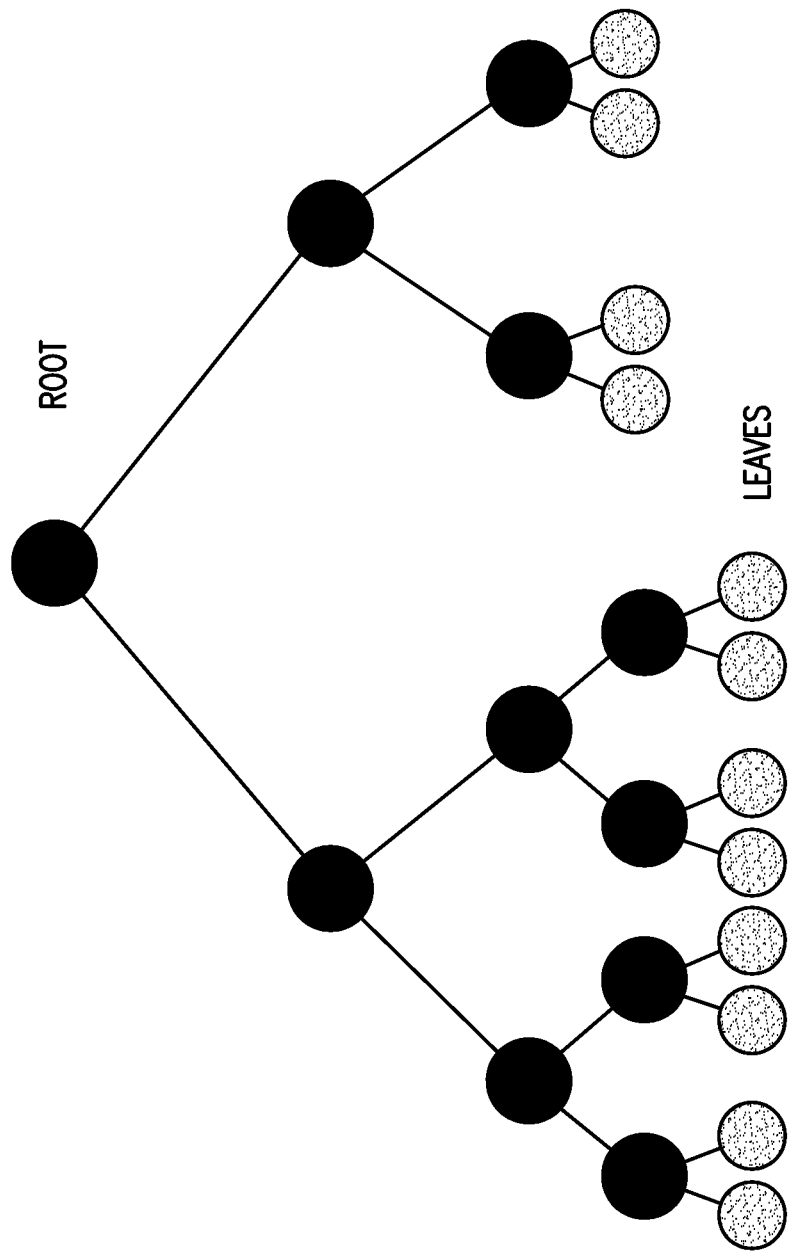
FIG. 9 illustrates a generic binary tree topology.

FIG. 9 illustrates a generic binary tree topology. The f-nodes are in blue and the leaves or c-nodes are in orange. Each bidirectional link has the same bandwidth and each f-node has two downward links to the next lower level and one port connecting upwards, to the next higher level. The root node may have a connection to a gateway, as may any of the leaves. The structure is recursive in the sense that a subtree may replace a leaf, creating a new tree. A complete tree is one where subtrees in each level are identical.

Number of c-Nodes

For a tree based on a module with p ports where k of the ports are reserved for bidirectional traffic within the tree and each leaf node uses one port, the number of c-nodes as a function of the levels in the tree is given by $$n = (p-k)\left(\frac{p-k}{k}\right)^{l-1} \quad \text{Equation (1)}$$

where l is the number of levels in the tree. For example, in FIG. 9, the left branch has 3 levels, 7 f-nodes and 8 c-nodes with p=3 and k=1. The arity of the tree is p/k−1, or 2 (i.e., binary).

For a 32-port module with 24 down links and 8 up links for each f-node, the number of nodes possible for a 7-level tree is then 17,496. Each f-node would connect to three (arity of 3) lower-level f-nodes and one higher-level f-node. This number grows exponentially with level while the diameter increases proportionally to level, specifically as 2l−1. A related quantity, the distance between two nodes, is the number of links that must be traversed; otherwise stated, this distance is the diameter of the subtree containing the two communication nodes.

Scalability (1)

By adding a subtree to replace one of the leaves, the number of c-nodes increases by p−k−1 while the number of f-nodes increases by 1. This relationship holds at any level. Since each f-node at the bottom of the tree is associated with p−k c-nodes, the single-node scalability would be the ratio of these two numbers, or $$s_1 = \frac{p-k-1}{p-k} \quad \text{Equation (2)}$$

Which is always somewhat less than 1. A scalability near 1 is a strong point in favor of the tree topology.

Latency & Diameter

The latency of a tree structure is also quite good since the network diameter is 2l−1 (latency is proportional to the diameter plus a constant overhead), where the diameter is $$D = 2l-1 \quad \text{Equation (3)}$$

This low diameter is one of the main points in favor of a tree topology.

Number of f-Nodes

The number of modules, m, each having p ports is found by summing up the modules in each level of the tree, and is $$m = \frac{k\left(\left(\frac{p}{k}-1\right)^l - 1\right)}{p-2k} \quad \text{Equation (4)}$$

Density

Here, the density is the ratio of the number of c-nodes to the number of f-nodes and is a measure of the cost of adding additional c-nodes. The full expression is given as $$p = \frac{a^l}{a^{l-1}}(p-2k) \quad \text{Equation (5)}$$

where a is the arity as defined above. This expression approaches p−2 k for a many-level tree and is yet another argument for a tree structure when this number is 2 or greater.

Bisection Bandwidth

The bisection bandwidth is the number of connections that must be broken to cut the tree into two equal parts. Referring to the figure, it is easy to see the value is simply half of the connections entering the root node:

$$B = \frac{(p-k)}{2} \quad \text{Equation (6)}$$

This rather poor value for the bisection bandwidth is the main argument against the tree structure.

Total Ports and Connections

The number of bidirectional ports is given by $$c = pm = \frac{pk\left(\left(\frac{p}{k}-1\right)^l - 1\right)}{p-2k} \quad \text{Equation (7)}$$

In the fabric, each port is connected to another port by a duplex connection for switched fabrics and a bidirectional connection for the DBOI-based modules. The ports at the leaves of the tree are connected to the c-nodes.

Reachability (in Paths Between Two Nodes)

The number of possible paths between any two c-nodes may be found by counting the possible connections that a message may take in traversing the tree, taking into account the multiplicity of paths between any two f-nodes:

$$R = k^{2l-2} \quad \text{Equation (8)}$$

l* is the number of levels in the subtree connecting the two c-nodes. Note that for two nodes on the same level, the reachability is rather small. This is not as limiting as it might be since traffic between two close nodes is not as seriously impaired by heavy fabric traffic, which becomes a serious problem as the distance between the communicating nodes increases. A related measure that is often useful is specific reachability or the path density (number of potential paths divided by the number of c-nodes).

Scalability (2)

The size of the tree may be doubled by doubling the tree and connecting both halves to a new root node. The doubling scalability, defined as the ratio of the number of network resources to the number of computing resources for such doubling, or S, is given by $$s_2 = \frac{m-1}{m} \quad \text{Equation (9)}$$

which approaches 1 as the level or number of f-nodes increases. Again, this near ideal scalability is a good argument in favor of a tree topology.

Summary

Table 1 is a summary of the properties of a tree constructed from p-port modules. Note that the fabric scalability is nearly 1, which is the maximum possible under the definition used in this portion of the instant disclosure.

The main drawback to the tree topology lies with its bandwidth characteristics. Node-to-node traffic, especially between nodes on different subtrees, places ever more stringent demands on the links as more nodes attempt to communicate across subtrees. Links at higher levels can quickly become congested with traffic, effectively shutting off subtrees until the traffic has cleared.

Assessment: the tree topology with multiple links between levels has near optimal scalability with the number of nodes growing exponentially with level. The diameter, and hence latency, is small; the node reachability is low between nodes on different subtrees and decreases with subtree size. In addition, the node density (number of c-nodes per f-node) reasonably good, being somewhat less that the number of ports per f-node. The bandwidth between nodes is limited with bandwidth bottlenecks appearing when multiple distant nodes need to communicate simultaneously. The bisection bandwidth is likewise poor, being essentially minimal. A tree topology is most useful when good scalability, low latency, and a large number of c-nodes are important.

Fat Tree Topology

Introduction

Fat trees, originally discussed by Leiserson [10], have the advantage that the bandwidth of links between levels increases to better handle traffic between the c-nodes. Ideally, the total bandwidth would be constant between levels, starting with the leaves or c-node level. This condition is not feasible for tree structures using today's commercial switches (whether InfiniBand or Ethernet) such as the fat tree illustrated in FIG. 15. Node reachability of the fat tree is significantly improved over the simple tree due to the additional potential paths through any subtree connecting two nodes. The advantage of low message latency holds for the fat tree as for the simple tree.

The scalability advantage of the simple tree is lost in the fat tree since scalability is achieved by replacing the c-nodes on a selected f-node by several f-nodes. In a fat tree, all ports are used by links to c-nodes or to other f-nodes, making the fabric saturated. One could always replace a c-node by an f-node, but that breaks the architecture of the number of links increasing with level. The resulting tree structure would indeed have a tree topology, but not the architecture of a fat tree. For this reason, the scalability in the strict sense must be zero.

The fat tree is often the preferred topology for InfiniBand clusters, however the disadvantages of a switched fat tree is the high cost and complexity of the switches and concentrators as level increases. For this reason, other means of constructing fabrics based on simpler switches is a topic of investigation (see below). In the introduction to this section, the goal was stated that, ideally, a fabric should be built from identical f-nodes.

The Doubling Fat Tree

Figure 10:
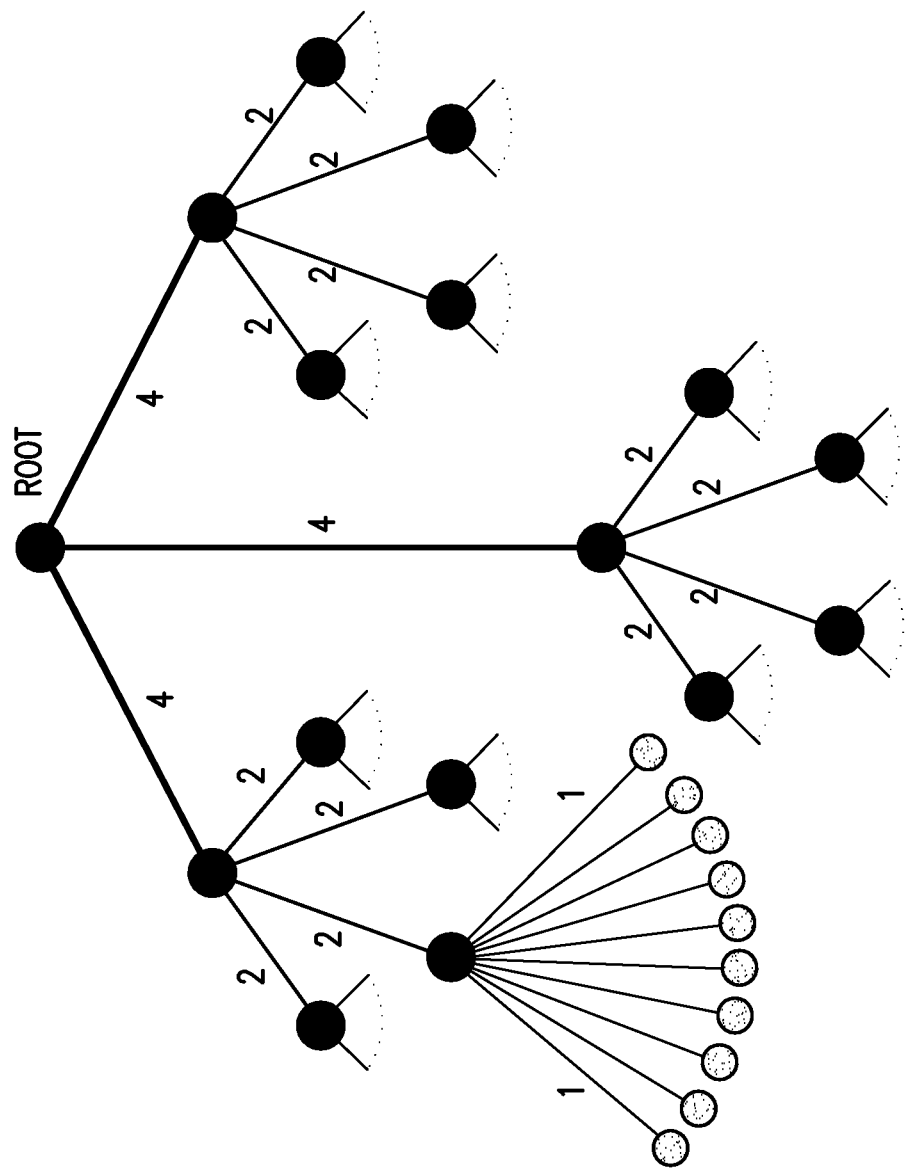
FIG. 10 illustrates a complete fat tree with 12-port f-nodes.

A specific instance of fat tree that has good reachability, bandwidth, and small diameter is the "doubling" fat tree, where the number of connections between f-nodes doubles (or increases at some other constant multiplier) at each level. Each c-node has one connection to the bottom row of f-nodes; each bottom-row f-node has two connections to each of the next row of f-nodes, and so on. Typically, the doubling implies that the number of ports possessed by each f-node is a power of 2. Since not all multiport interconnects are based on powers of 2, it is instructive to consider the general case. For a prime-number p of ports (for example, 7 ports) per f-node, there is only one node in the tree,—in other words, the tree simply consists of the interconnect with p c-nodes attached. FIG. 10 illustrates a more general case where the number, p, of f-node ports has several prime factors. Note that the arity of the f-nodes decreases from leaf to root.

FIG. 10 is an illustration of a complete fat tree with 12-port f-nodes. The f-nodes are in blue and the leaves or c-nodes are in orange, where only one branch of c-nodes is shown. The bandwidth of the edge or leaves is normalized to unity for the c-nodes. The bandwidth from each f-node increases by a factor of 2 (in this case). The factors of 12 are 3,2,2,1 so the number of subtrees at the root level is the first factor, or 3. The number of connections from a lower level and to a higher level always sum to the number of available ports. This example has 3 levels.

The general case, where p is not a prime number nor necessarily a power of 2, turns out to result in a fabrics with good latency, as in the simple tree, and improved bandwidth and path reachability over the simple tree. A closed form expression for the values of the various properties is simply not instructive as it is based on products and differences of the prime factors of the number of ports, p. The appendix provides an algorithm for the construction of the doubling fat tree and Table 2 gives some specific examples for several different values of p.

In Table 2, the column labeled 12 Ports corresponds to FIG. 10 above. The 32-port column corresponds to the 32-way DBOI interconnect while 48-port modules are commonly found in both Ethernet and InfiniBand devices. The 72-port entry represents another member of the DBOI family.

The factored fat tree (as illustrated above) may be flattened by incorporating the first two factors into the root level. Thus, with the factorization 4*2*2*2, f-nodes with 32 ports may be used to construct a 4-level tree with the same number of c-nodes as the 5-level structure shown in the above table. The density will be only slightly less, but the diameter reduces by 1 unit, which may be significant for a small number of levels. Note that collapsing levels in a tree whose factors are not powers of two always results in fewer c-nodes.

Summary

A fat-tree fabric is not scalable since all ports are used (the tree is saturated) and replacing a c-node with an f-node would "break" the architecture even while maintaining the topology. That is, the topology would still be that of a tree, but the architecture of a fat tree would no longer hold after such an addition.

While the fat tree shows a marked bandwidth improvement over the simple tree, bandwidth still remains an issue, especially for applications where incoming queries demand parallel searches involving all nodes (for example, database searches using inverted indices typically present on all c-nodes or web-page retrieval requires information from a large number of servers). The result of these access constraints is that many c-nodes will require frequent communication, perhaps spanning the entire tree, and thus creating congestion and bottlenecks. As above, node-to-node traffic, can quickly overwhelm the fabric.

Assessment: the fat-tree topology supports a large number of c-nodes while having a small diameter (hence low latency). The node reachability, while definitely improved over the simple tree, remains small, even for distant nodes. Node density (number of c-nodes per f-node) remains about the same as before. While the bandwidth shows an improvement over the simple tree, it is limited by bandwidth bottlenecks appearing when multiple distant nodes need to communicate simultaneously. The bisection bandwidth is still poor. Although the fat tree is an improvement over the simple tree, it still lacks in bandwidth and reachability. The best argument for any tree structure remains its low latency.

Clos Topology

Figure 11:
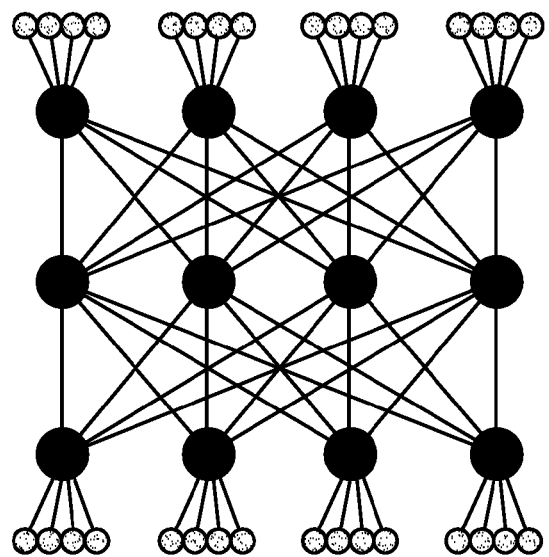
FIG. 11 is an illustration of a symmetric Clos topology with bidirectional links.

The Clos topology (see Ref. 7) originally consisted of an input layer of nodes coupled to an output layer by three layers of switches. There are n nodes in both the input and output layers. The first switch layer had r switches each with n inputs and m outputs; the middle layer had m each r*r switches, while the third layer had r each m*n switches. A symmetric Clos network may be defined by taking r=m=n. A variation that doubles the number of c-nodes has bidirectional links between all nodes. FIG. 11 shows a symmetric Clos network with bidirectional links and 8 ports per f-node. (A single f-node with p ports supports exactly p c-nodes.) The Clos network shown below supports $2(p/2)^2$ c-nodes also using f-nodes with only p bidirectional ports.

FIG. 11 is an illustration of a symmetric Clos topology with bidirectional links. This example is constructed with 8-port modules.

Table 3 summarizes the properties of the symmetric Clos topology, showing symbolic expressions for the values.

Unlike the tree topology (with an unused port or ports at the root level), there are no available nodes for extending the number of c-nodes: that is, the Clos network is not scalable. In fact, it may be termed "saturated" since all available ports are used. The only way to increase the number of c-nodes is to use f-nodes with more ports. Of course, one could replace one or more c-nodes by a gateway to another network, but that would break the topology and cause problems that would ripple throughout the system, affecting message passing, routing tables and algorithms and so on.

A fabric as in FIG. 11 but with the middle layer removed was used by IBM in its RISC SP system[11]. However, it is easy to see that the resulting two-layer network is blocking. Although it resembles a Clos network, the two-layer system is not considered to be of the Clos family, especially since it is known that, under certain mild conditions, the Clos network is rearrangeably non-blocking. (The above network with m=n is rearrangeably non-blocking as discussed in Ref. 7.) However, the time needed for path rearrangement is prohibitive in a packet network and is seldom used. Thus, the three-layer Clos must be considered a blocking network, as does any layered switched based on the Clos topology.

If the ports are configured as unidirectional, the network supports twice the number of c-nodes with twice the number of f-nodes before all ports become saturated. In this case, the bottom row of the fabric contains the inputs to the $p^2$ endpoints while the top row contains the outputs from the fabric to the same endpoints.

This network is not scalable in the strict sense as all ports are used and replacing a c-node with an f-node would "break" the topology.

Assessment: the symmetric Clos topology with bidirectional links between all ports has a small diameter (hence low latency), a good density (comparable to the tree topologies), and a good bisection bandwidth. Adding an additional middle layer greatly increases the reachability or path redundancy between c-nodes as well as the bisection bandwidth. The scalability is non-existent as all ports are completely occupied. The Clos topology is a good choice for smaller installations (fewer than about 5000 c-nodes), where low latency, high reachability, and high bisection bandwidth are important.

Augmented Clos Network

If one keeps the same Clos topology as above but re-architects the f-nodes to consist of "pods" as defined in Ref. 1, a network that scales as p^4 is obtained, thus extending this augmented fabric to far greater numbers of c-nodes. This new architecture has higher bandwidth and path reachability than the regular Clos network while increasing latency by 21 units, where the number of levels, l, is as defined above. In spite of the absence of strict fabric scalability of the Clos topologies, it is still possible to construct very large networks by this method using the same f-nodes (with p ports as is done throughout this portion of the instant disclosure). FIG. 19 illustrates this construction.

Figure 12:
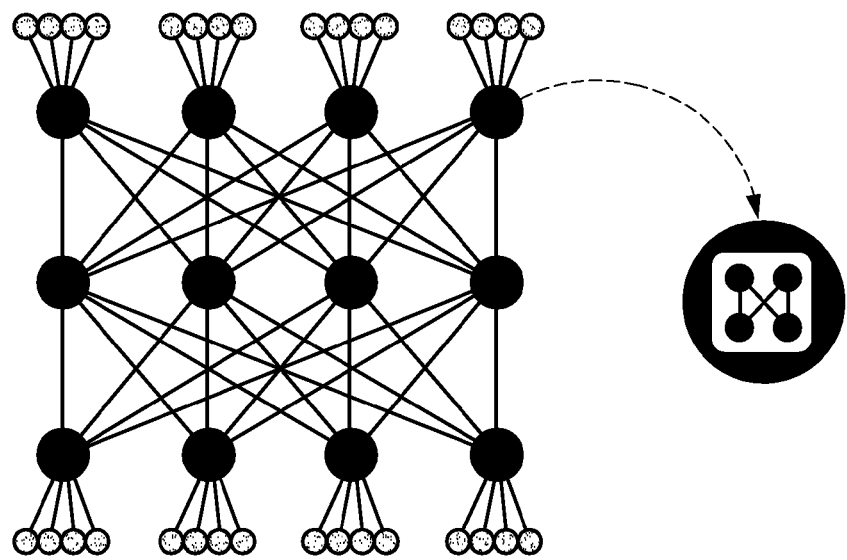
FIG. 12 is an illustration of an augmented, symmetric Clos topology.

FIG. 12 is an illustration of an augmented, symmetric Clos topology. The topology is identical to that of FIG. 11 above, however it is constructed entirely of 4-port f-nodes. The pod or synthetic f-node is shown in an expanded view to the right of the Clos fabric.

Table 4 summarizes the properties of this pod-based architecture.

Each of the f-nodes in the synthetic node shown on the right of FIG. 12 is comprised of a p-port module, with p=4 in this example. The synthetic f-module, or pod, is constructed as a sub-fabric with two fully-connected rows of p/2 f-nodes each. This construction leaves the topology invariant, with f-nodes being replaced by pods of f-nodes. Note that the number of c-nodes now increases as $p^4$, effectively much faster than the simple symmetric Clos fabric. However, the density (number of c-nodes per f-node) is half that for same number of f-node ports since many ports are consumed within the pods and not dedicated to the endpoints. Unsurprisingly, the cost for supporting more c-nodes is an increase in fabric hardware.

Assessment: the augmented Clos topology with bidirectional links between all ports has a small diameter (hence low latency). Its bisection bandwidth is greatly improved over that of the symmetric Clos fabric, but the density has decreased. As above, additional middle layers greatly increase the reachability or path redundancy between c-nodes at the expense of even lower density. The augmented Clos topology is a good choice for large installations with between about half a million up to 10s of millions of c-nodes. Smaller numbers of c-nodes are possible simply by partial population of the fabric.

Modified Clos Topology

Vahdat and co-workers[12], and Ref. 1, have presented a variation on the Clos network that, while not scalable in the strict sense defined above, allows rearrangeably non-blocking connections between any two nodes. The authors note "An advantage of the [modified Clos] topology is that all switching elements are identical, enabling us to leverage cheap commodity parts for all of the switches in the communication architecture. Further, [this fabric is] rearrangeably non-blocking, meaning that for arbitrary communication patterns, there is some set of paths that will saturate all the bandwidth available to the end hosts in the topology." from Ref. 1.

Figure 13:
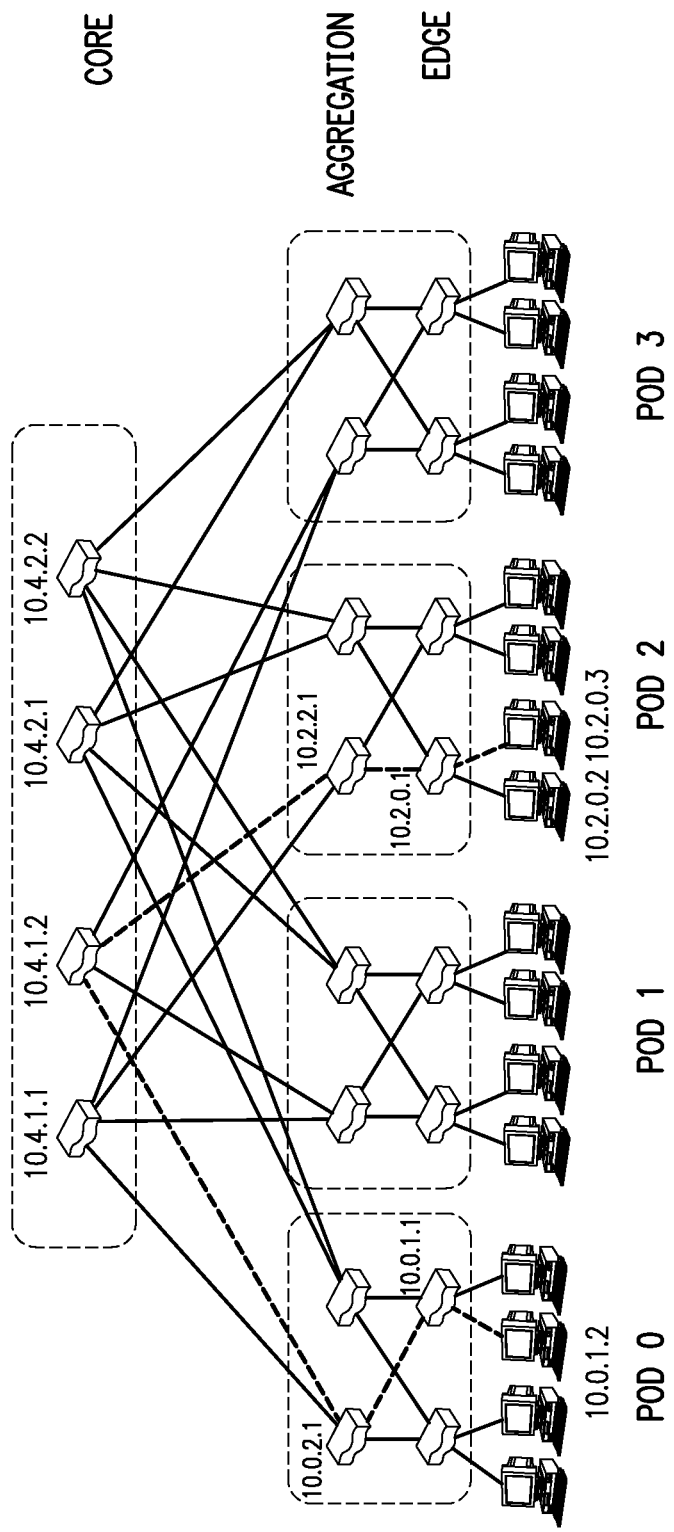
FIG. 13 is an illustration showing a modified Clos network.

FIG. 13 is an illustration showing the proposed modified Clos network.

This non-blocking assertion is made without proof, relying on partial similarity of their topology with the Clos network, which is provably rearrangeably non-blocking if the number of exit ports at the first level is greater than or equal to the number of exit ports at the host or edge level as explained in Ref. 7. Note that, in practice, the "rearrangeably" modifier typically requires complex software, buffers, and support tables or routing methods involving flooding and message re-ordering.

Figure 14:
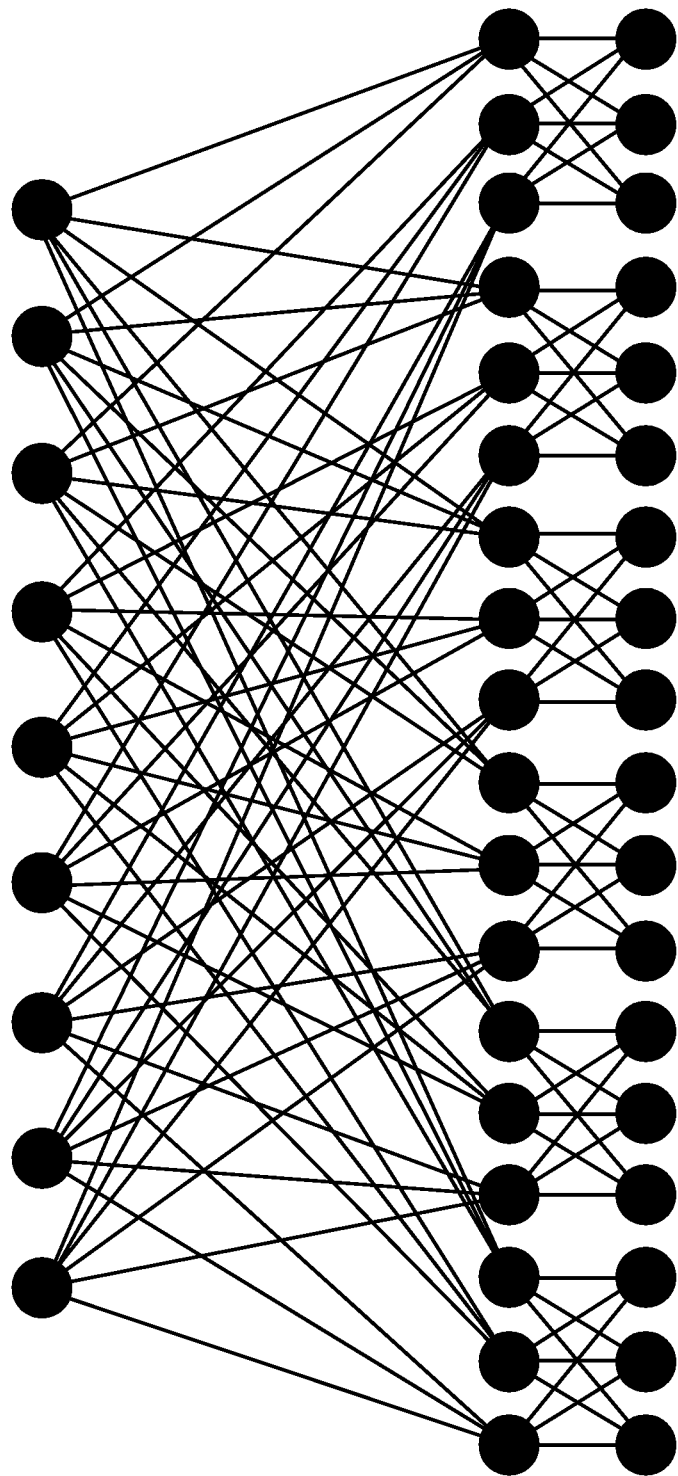
FIG. 14 is an illustration showing the $p^3$ property of the modified Clos network.

To illustrate how this topology scales with number of ports per module, consider FIG. 14 with 6 ports per module. Note that there are 9 modules in the top or core layer and 6 modules in each of the 6 pods (In FIG. 13, there are 4 modules in each of the 4 groups and 4 in the core layer).

FIG. 14 is an illustration showing the p^3 property of the modified Clos network. In this example, the f-nodes have 6 bidirectional ports (neither the c-nodes nor their connections are shown).

Summary

From these two FIGS. (13 & 14), it is simple to infer the number of endpoints, modules, and connections allowed by using modules with p ports. The bisection bandwidth and reachability also become apparent after a going through a counting exercise. Alternatively, the values may be deduced from the number of ports, the pod construction, and constraints of port saturability and the number of levels above the edge or c-node level. The diameter remains equal to one less than twice the number of levels, as in any tree-like structure. Table 5 presents a summary of the modified Clos topology.

This network is not scalable as all ports are used and replacing a c-node with an f-node would "break" the topology. However, as above, there is a way to augment this fabric to large numbers of c-nodes without altering the topology.

Assessment: the modified Clos topology is similar in many respects to the symmetric Clos topology. The most interesting departure is its p^3 c-node scalability. In addition, this topology has a small diameter (hence low latency), moderate density (ratio of compute hardware to network hardware), and a good bisection bandwidth. This topology lies between the two Clos networks of the previous section in density and horizontal scaling with the number of f-node ports.

Augmented Modified Clos Topology

Just as the symmetric Clos fabric could be augmented to scale with port number as (p^4), so can the modified Clos fabric be augmented with the pod concept to scale with port number as (p^6). Of course, pods may be nested recursively to achieve very large fabrics even with modules containing only a few ports. Fabrics serving hundreds of millions of c-nodes, having very high bisection bandwidth and reachability, with modest latency and a good ratio of computing resources to fabric hardware are possible with this topology.

When dealing with pods that comprise a sub network of interconnect modules, it is convenient to keep the term "f-node" to refer to a topological node in the particular network. To distinguish the fabric node or f-node from the interconnect or switch module that comprises that node, refer to such a module as a "p-module", indicating that the same sized modules with p ports are used to construct the pod. This term only makes sense in the augmented Clos networks and any fabric whose f-nodes are pods of p-modules. Note that the definition of the modified Clos fabric given in Ref. 1 makes use of the p-ported module, so the designation "f-node" will be retained in that case.

Each f-node in the modified Clos network is replaced by a pod (the pods then become pods of pods), and each pod consists of p each p-modules. This is obviously a recursive structure since it is straightforward to construct a pod of pods and so on, leading to fabrics that rapidly scale with p while improving in density, bandwidth, and reachability. Table 6 displays the properties of the pod-augmented, modified Clos network.

Assessment: the augmented modified Clos topology has all the features of the modified Clos topology but with a lower density, vastly more c-nodes, much larger bisection bandwidth and reachability, all at the expense of a 2*increase (less 1) in diameter. For very large networks, this topology is one of the most promising, but is costly due to the low c-node density.

Mesh/Grid

It is generally thought that the mesh is the most expensive topology because it typically requires a costly fiber-channel switch. This view seems to be present even for the special case of a regular grid topology. The mesh scalability is also recognized as optimum and the mesh has good bandwidth scalability (below). As will be seen in a subsequent section, the need for a fiber-channel switch is not inherent in the mesh architecture.

The properties of the regular grid topology make it a clear choice for many supercomputer designs, where high reachability, bisection bandwidth, and extensibility (horizontal scalability) are important.

FIG. 15 illustrates a mesh interconnect spaced on a regular two-dimensional grid. There are bidirectional connections between each of the nodes represented by the double arrows. The unconnected arrow ends may connect to other similar f-node/c-node combinations or wrap around to connect to their farthest grid partners, forming a torus.

FIG. 15 is an illustration of a two-dimensional mesh on a regular grid. Nine f-nodes are shown (blue circles) with the corresponding nine c-node complexes (concentric orange circles). Each f-node is connected to its 4 nearest neighbors in the north-south and east-west directions by high-bandwidth, bidirectional connections (black double arrows). The c-node complexes contain at last one and probably a dozen or more of individual c-nodes.

Reachability

The reachability or number of paths in two dimensions is given by a binomial coefficient as the number of possible ways to walk on a lattice between two lattice points. Each of these paths represents the shortest Manhattan distance between the two points; that is, all of these paths are of equal length, providing a multiplicity of path choices, each with the same latency. A derivation of this number gives the following expression for a 2D grid $$r_2 = \frac{(\Delta_x + \Delta_y)!}{\Delta_x! \Delta_y!} \quad \text{Equation (10)}$$

where $\Delta x$ and $\Delta y$ are the grid distances in the x- and y-directions. This generalizes to 3 and higher dimensions in the obvious manner via the multinomial coefficient. In 3 dimensions, the number of possible paths is $$r_3 = \frac{(\Delta_x + \Delta_y + \Delta_z)!}{\Delta_x! \Delta_y! \Delta_z!} \quad \text{Equation (11)}$$

Scalability

By linking in an additional f-node at one of the free connections, a total of p-k c-nodes are added to the fabric. This addition increases the number of free connections unless f-nodes are added along an entire edge (in the 2D case) or over an entire face (in the 3D case). The density remains constant and the scalability is therefore optimal at unity.

Summary

Table 7 summarizes the properties of the regular mesh topology. In Table 7, the units for the bandwidth are the number of links between f-nodes. If each link has multiple channels, the true bandwidth numbers must be multiplied by the channel multiplicity. That is, if each link contains q parallel connections, both the number of connections and the bisection bandwidth must be increased by a factor of q. Thus, 2 d m→2 d q m and $D_1 D_2 \ldots D_{d-1}$→$q \times D_1 D_2 \ldots D_{d-1}$.

Like the other fabrics discussed in this portion of the instant disclosure, the regular mesh may be augmented using the pod concept (synthetic f-nodes). If each p-module has p ports, a level-one pod or f-node will have $p^2/2$ ports as will each of the fabric modules. That is, in the above table, replace p by $p^2/2$ to obtain the augmented fabric. The number of available ports for communications between fabric modules and between fabric modules and c-nodes increases from p to $p^2/2$ allowing a different partition between communications ports and c-nodes. That is, the bandwidth of the links in the mesh may be increased or the number of supported c-nodes increased, or both. The pod concept simply provides more flexibility in the design of a regular mesh fabric.

Torus

A torus topology is achieved by "wrap-around" of the edges or faces of the regular mesh topology. The f-nodes at the edges (or faces) are connected to those f-nodes on the opposite edges (or faces). In FIG. 15, the f-nodes on the right are joined to the ones on the left, and the top to the bottom. This topology is frequently found in proprietary interconnects in the HPC world. Tofu and Gemini 3D interconnects were mentioned above.

Given the wrap-around structure, the bisection bandwidth of a torus is twice that of the corresponding regular grid mesh while the diameter is cut in half, making the torus an efficient implementation of the regular mesh. The toroidal topology maintains a scalability of 1 and the density is unaffected.

The hypercube is a subset of the torus. Specifically, a d-dimensional hypercube interconnect is a torus of d dimensions with exactly $2^d$ nodes. Such hypercubes often serve as local interconnect structures for c-nodes within each of the f-nodes. As an example, in the Tofu interconnect [Ref. 3], the f-node grid has a 3-dimensional toroidal topology while each f-node contains 12 c-nodes in a 4-dimensional hypercube arrangement (4 of the c-nodes are removed to reduce the number to 12). This arrangement is loosely referred to as a "6-dimensional" topology where it is, in fact, a 3-dimensional fabric of f-nodes with a diminished 4D hypercube of c-nodes located at each f-node.

Figure 16:
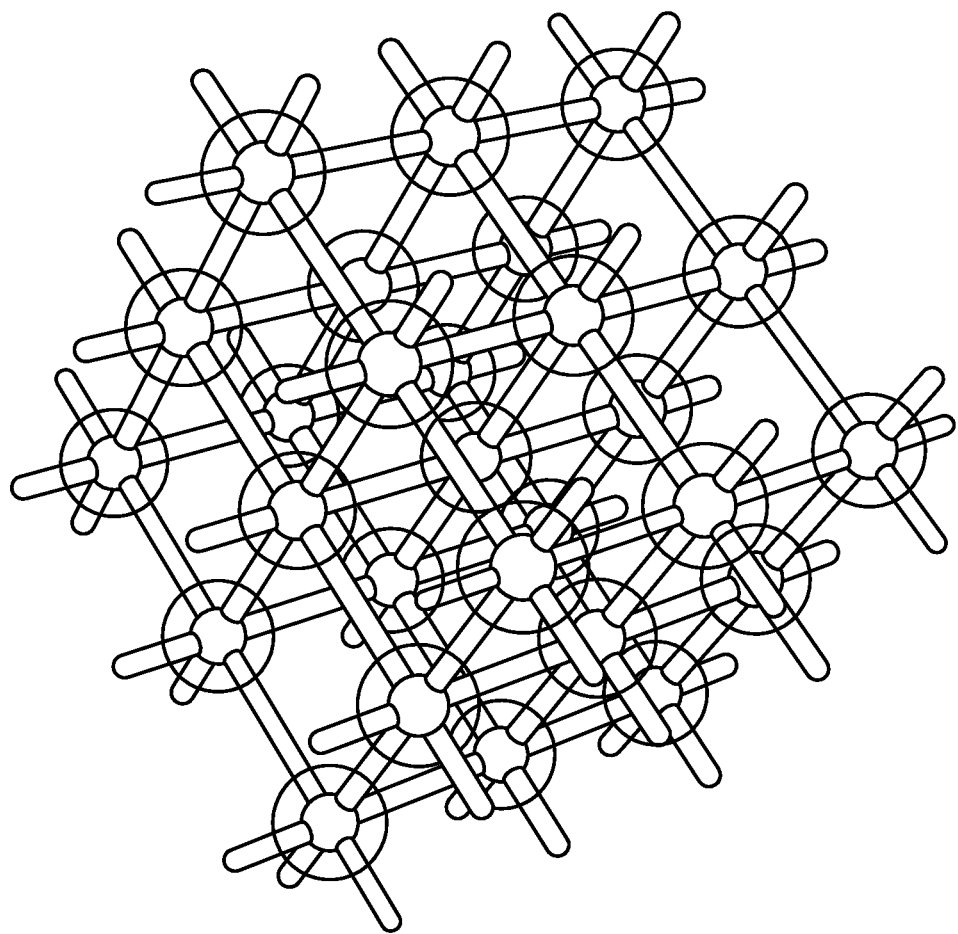
FIG. 16 illustrates a 3-dimensional mesh on a regular grid.

FIG. 16 shows a regular mesh or grid in three dimensions with 27 f-nodes. The connections present on each of the 6 faces are used to extend the mesh to a larger size in each of the three dimensions and to wrap around to the opposite face to provide the toroidal topology.

FIG. 16 is an illustration of a three-dimensional mesh on a regular grid. The blue spheres represent the f-nodes, the orange spheres represent the connections to the c-nodes, while the green pipes represent the bidirectional connections between f-nodes. Each f-node has 6 bidirectional connections, one to each of its nearest grid neighbors. The dangling connections on the 6 faces are used to extend the 3D grid or for "wrap-around" to form a 3D torus.

In the case of a DBOI interconnect, each of the c-nodes may at each f-node be interconnected by those ports not used to connect to adjacent f-nodes. This is a more efficient interconnect for the group of c-nodes than the hypercube mentioned above, being an single-send multicast interconnect with unit diameter, hence minimal latency.

Bandwidth Scalability

In spite of the rather large diameter of a multidimensional grid, the torus configuration is found in most of the high-end supercomputers. One reason for this is that each f-node may consist of multiple p-port communication modules or switches, effectively increasing the bandwidth as needed. For example, in a 3-dimensional torus, each f-node has 6 connections to its nearest grid neighbors, and, as above, p−2d connections to the c-nodes associated with the mesh node. A 72-port interconnect module can serve as an f-node in this topology with 6 channels in each of the 6 grid links and have 36 ports left over to communicate with the local c-nodes. This mesh node can then support from 1 to 36 c-nodes, with the available bandwidth diverted to a single c-node or distributed evenly among a plurality of c-nodes.

A doubling of bandwidth is achievable by assigning two of these 72-port interconnects to each f-node, with the 144 communications ports distributed as needed among the fabric communications and the computational resources. This flexibility and bandwidth scalability is one of the reasons for the use of the torus topology in supercomputing. With the advent of the switchless, DBOI interconnect, the torus topology should become available outside of the HPC community.

Reachability

Because of the possibility of wrap-around, the number of possible paths on a torus is much larger than that found above for a regular grid. In the wrap-around case, paths do not necessarily have the same Manhattan distance or latency as the direct paths; they may be shorter or longer, depending on the locations of the two communicating f-nodes. In the two-dimensional case, there are four possibilities to consider:

direct distance with no wrap around,
direct in the x-direction with wrap around in the y-direction,
direct in the y-direction with wrap around in the x-direction, and
wrap around in both directions.

Each of these paths may have different Manhattan distances and hence different latencies. In two dimensions, the expression for the number of possible paths is $$\{r_{xy}, r_{xy^*}, r_{x^*y}, r_{x^*y^*}\} = \left\{ \frac{(\Delta_x + \Delta_y)!}{\Delta_x! \Delta_y!}, \frac{(\Delta_x + D_y - \Delta_y)!}{\Delta_x!(D_y \Delta_y)!}, \frac{(D_x - \Delta_y + \Delta_y)!}{(D_x - \Delta_x)! \Delta_y!}, \frac{(D_x - \Delta_x + D_y - \Delta_y)!}{(D_x - \Delta_x)!(D_y - \Delta_y)!} \right\}$$

Equation (12)

where the * refers to the wrap around and $D_x$ and $D_y$ are the lengths of the grid in the x- and y-directions. The total number of possible paths is the sum of the four expressions in brackets. The corresponding expression in three dimensions has 8 possible path expressions; displaying the result would add nothing to the discussion, but the number is derived in the same manner as shown above. In short, the number of possible path distances goes approximately as 2 raised to the number of dimensions. Thus, if number of possible paths is importance, a high-dimensional torus is probably the topology of choice.

Assessment: the toroidal topology has double the bisection bandwidth and greatly more than twice the reachability of the corresponding grid topology. The torus is primarily used in HPC where the scaling properties of the fabric allow the grid to be grown at will using simple, existing f-node connections. The bandwidth scalability might prove useful in future data centers.

Summary of Fabric Topologies

The analysis of the topologies presented in this section was port-driven, based on the goal of addressing the needs of large data centers with commercially available interconnects having a limited number of communication ports. The main constraint was that of homogeneity of design where the same module is used throughout the fabric.

Other topologies could have been considered. For example, the "hypertree" interconnect that was used in the 1980s in the Connection Machine is one such possibility. However, the hypertree is related to the fat tree and is not used that often, so a separate analysis is not necessary at this time.

Summary of Properties of the Various Topologies

Table 8 summarizes the relevant properties of the three basic topologies analyzed above (tree, Clos, and grid or torus). The fat tree is not included in this table because of the complicated formal expressions (the fat tree is included in the numerical examples in the following table). The form of the various entries (for example, number of c-nodes) clearly shows that there are actually three topological families displayed (tree-based topologies, Clos-based topologies, and grid-based topologies). Each of the topologies is based on p-modules as the unit of fabric construction and the nodes in the various networks are fabric nodes or f-nodes.

Table 8, while useful in comparing the essential properties of these topologies for design purposes, is perhaps not instructive when it comes to the magnitudes involved. The following section displays some of the actual numbers available with a 32-port interconnect as the basic building block.

The main use of this table 8 is in the design of interconnect fabrics to be able to make priority choices between density, diameter (latency), and bandwidth. The individual expressions indicate the possible basic trade-offs. For example, the six-degree Clos structure ("augmented, modified Clos") has a much higher bandwidth than the second-degree Clos structure, but has a larger diameter.

Numerical Tables

Table 9 displays the numerical values for various fabrics built with 32-port p-modules. The tree example and the grid example are not saturated, meaning that they can be extended to far larger systems (or reduced to smaller ones). The four flavors of the Clos topology are saturated, as is the fat tree, in that all available p-module ports are occupied with fiber connections either between p-modules or from the edge p-modules to the c-nodes.

Table 10 is a similar table based on 72-port p-modules. The Augmented Clos and Augmented M-Clos entries are included even though the numbers are astronomical, without little practical meaning. With 72 ports, more bandwidth can be allocated between f-nodes in the torus example, increasing the bisection bandwidth as shown in the table. Obviously, the large number of implied connections required for the augmented, modified Clos topologies becomes unreasonable, and the corresponding column in these tables is for illustrative purposes only.

Comparing the number of paths (reachability) in each of the 7 cases, it is evident that the fat tree and the torus (also, possibly the tree and the augmented modified Clos) fabrics will require some careful routing management to limit searching the set of possible paths in switched architectures where routing tables are essential.

Comments:

It is not necessary to build out the Clos fabrics to saturation (partial fabrics may be useful).

The grid or torus topology is the most easily extendable to larger fabrics.

The number of connections (cables, optical fibers, etc.) required to interconnect the fabric ports and the endpoints to the fabric is half the number of ports in the above tables plus the number of c-nodes Remarks on Choosing a Topology The two tree topologies have the lowest bisectional bandwidths and the highest densities as well as medium latencies (diameter). This is the basic trade-off in topology selection: is bandwidth important or not? The reachability (paths) seems good, but paths per node is rather poor, indicating that trees have congestion problems. If bandwidth between fabric nodes is the key issue, then the torus topology with multiple ports between f-nodes might be the preferred choice. The three-dimensional torus topology seems to be found only in super-computer installations, probably due to its high cost of implementation and management with proprietary switches. These problems are no longer critical when the fabric modules are switchless (this is a topic for the next section) and it is expected that the torus will be seeing more use in data centers in the future.

The path density (number of potential paths divided by the number of c-nodes) is quite low for the tree topologies but is one half (0.5) for the Clos topologies and can be quite large for the torus. This path density is a measure of potential congestion in the fabric as well as a measure of tolerance for self healing, making it a possible overriding factor in topology selection. Fabric management becomes a key consideration with systems having a large path density. Switch patterns must take into account the multiplicity of paths, typically by path pruning and constructing spanning trees. Such path reduction is not necessary in a switchless fabric.

The two tables above may be used for a first-pass selection of a topology and a fabric module or a particular f-node architecture. For example, if high density (low fabric cost relative to computational cost) is important, a fat tree or a grid topology might be selected. If bisection bandwidth is of concern, the modified or augmented Clos topologies are clearly better. If extensibility and node bandwidth are important, the torus has advantages. If latency is important but bandwidth of little interest, then a tree topology might be a better choice.

Note that this approach to topology selection does not consider the computational efficiency gained by higher reachability (paths) and bisection bandwidth, nor does it consider the increasing costs and complications of fabric management with increasing number of c-nodes.

The two tables above allow one to make some statistical inferences of a more certain fashion than done above. Such correlations based on the numerical tables are easier to interpret than comparing the symbolic expressions. Based on this small number of fabric types and the two values for the p-module ports, certain correlations are near unity, implying that the conclusions may be drawn directly from Table 8 in a deterministic fashion. For example, the obvious correlation between number of p-modules and c-nodes is very close to unity as is that between p-modules and bisection bandwidth; this holds for both the 32-port modules and the 72-port modules, as expected.

Several conclusions regarding choice of topology may be made with the help of such correlations. In particular, conclusions concerning bandwidth, redundancy or reachability (paths), and latency may be drawn.

Bandwidth: Determined by Amount of Fabric Hardware

It may be inferred from the above tables that the correlation between bisection bandwidth and number of p-modules is essentially unity. Hence, increased bandwidth comes at the expense of additional hardware used to increase the number of f-nodes. Otherwise stated, if high bisection bandwidth is of importance, the fabric requires a large number of f-nodes, increasing the cost of the installation. This is not particularly surprising, but the quantitative expression in Table 8 is useful in comparing potential designs.

Latency: Determined by Topology

From the above tables, it is evident that the tree Clos and modified Clos topologies have the lowest latencies. In tree-like topologies, which are scalable, the diameter and hence latency grows as the logarithm of the number of nodes, meaning that for large number of nodes, the tree structures exhibit more latency than the Clos topologies. The diameters of the Clos topologies remains constant with number of f-node ports since the all Clos topologies have a constant 3 layers (the augmented cases are based on internal sub networks, so the diameter in terms of p-modules increases as the pods are nested). The diameter of the torus grows as the number of f-nodes to the ⅓ power (in three dimensions) and as the square root in two dimensions. Thus, for large numbers of nodes, the Clos topology has the lowest diameter and, hence, latency. However, as will be seen below, fabric architecture also plays an important role in message latency.

Reachability: Determined by Topology

The correlations between the number of possible paths between two endpoints is either low or negative over the set of remaining properties listed in the left-most column in the above tables. However, the correlation between the paths for the two sets of port values (e.g., 32 and 72) is above 90%, meaning that the number of paths correlate with the topology rather than any of the individual properties.

Scalability: Determined by Topology

The Clos topologies are not scalable since the fabric size is determined by the number of ports in the f-node or pod. However, a Clos fabric may be designed for a maximum number of nodes and then partially populated as mentioned above; similarly with the fat-tree topology.

The two scalable topologies are the tree and the torus, both having a scalability of unity, where adding another f-node increases the number of c-nodes proportionally. The drawback to the torus is its larger diameter while the tree has poor bisection bandwidth and path redundancy when compared to the torus.

Blocking

The tree topologies are generally unconditionally blocking since the number of end nodes is greater than the number of links from the lowest (edge) level to the next level in the tree. The other topologies are conditionally blocking, for example it is trivial to find traffic patterns for the symmetric Clos that block other paths. One may overcome this defect by doubling the number of modules in the middle layer, but the resulting fabric is no longer constructed from identical modules.

The number of paths can be greatly expanded by increasing the number of levels in the Clos fabric. The resulting network has a lower probability of blocking, but at a cost of increased fabric hardware and larger diameter.

The torus is blocking if the dimensionality is less than p/4 since the number of attached endpoints would then be greater than the number of fabric links. This suggests that high-dimensional toroidal topologies might have distinct advantages over the Clos topologies.

Choosing the optimum topology for a given application depends on many factors, entailing multiple compromises.

Packet-Flow Fabric

Introduction

From the discussion on topologies above, the main trade-offs are between the number of f-nodes per c-node ("density" or fabric hardware overhead) and the number of potential paths per c-node ("specific" reachability or path density) as well as bisection bandwidth and density: a high node density is correlated with a low path density and a low bisection bandwidth (the respective correlation coefficients are negative). The need for spanning trees reduces the usable path density with the result that tree topologies appear more favorable, having higher path densities and thus exhibit lower congestion. That is, if the number of potential paths could be fully exploited, then the Clos and torus topologies would be seen to be superior to the tree topologies. Otherwise stated, if the number of potential paths is limited by the spanning-tree algorithm, the tree becomes the preferred topology. Node density and bisection bandwidth become the deciding factors, with the tree and fat tree structures dominating the node-density measure even though they both have poor bandwidth and high congestion. These secondary concerns imposed by path management drive the choice of topology at the expense of the primary design considerations of latency and bandwidth.

When extending data centers to large numbers of endpoints, switched fabrics tend to become unmanageable due to the large number and size of routing tables necessary for efficient traffic management and switch control. This is particularly evident in InfiniBand implementations. Also, it is well known that the spanning-tree algorithm is unstable [Ref. 5] and requires that all switches "learn" the topology reflected in multiple copies of the routing tables as mentioned in Ref 12.

Under a broadcast or multicast operation, multiple channels must be opened, either sequentially or in parallel. Thus, broadcast or multicast operations co-opt large portions of the fabric either simultaneously or sequentially, in smaller portions but for a longer overall period, leading to both temporal and spatial high-traffic conditions which, in layered switches, can lead to congestion. These problems cannot occur in a packet-flow fabric based on the DBOI f-node.

In this section we describe the DBOI modification necessary to create a fabric node supporting packet flow and show how to create very large and resilient networks whose essential properties are superior to those of switched fabrics. The two main characteristics of the packet-flow module are
1. Absence of switches, and
2. Absence of routing and forwarding information bases, and are key in constructing a fabric that can be extended to very large numbers of nodes without a corresponding increase in the difficulty of managing the message flow within the fabric.

Subsequent sections discuss how these two main characteristics provide the necessary structure on which such large and efficient fabrics may be constructed.

Many of the difficulties encountered in switched fabrics, such as scalability, traffic management, input and output queue management, congestion management, and low bisection bandwidth can be overcome using a packet-flow module based on the optical interconnect introduced in the initial Background section.

The Packet-Flow f-Node

The packet-flow f-node is a simple modification of the original DBOI, yet leads to many advantages over a switched fabric.

The Original DBOI Module

As originally designed and constructed, the DBOI system consists of an optical module and four electro-optical modules (in the 32-way version). Electronic signals, in serial form, from eight different hosts, typically from PCI-Express interfaces, are input to each of four electro-optical modules or electro-optic network interface controllers (EONICs). Laser drivers and lasers are located in the first section of each EONIC board where the electronic signals are converted to streams of serial light pulses in single-mode lasers. These optical data are sent to the DBOI optical module over single-mode optical fibers where each of the 4*8 optical beams are expanded and split into four equal beams. Each of the four copies of each of the 32 beams is sent to a different collecting lens and focused onto four exit arrays of 32 ball lenses each, which couple each of the four sets of 32 beams into four bundles of multi-mode fibers. Each bundle then contains a copy of the original 32 electronic signals but in the form of modulated light.

Each bundle of 32 fibers connect to one of four identical EONIC modules, where the optical signals are detected and converted into serial electronic signals. In each EONIC module, the 32 data streams are filtered by logic so that only those signals meant for any of the eight endpoints served by that particular module are passed on to a fan-out device, which further splits each signal (those allowed to pass) into eight copies, one potentially for each of the eight endpoints served by that particular EONIC module. A fan-in, preceded by another stage of filtering logic, takes place at each of the exit points prior to conversion of the signals to, e.g., PCIe format, suitable for the host computers. Logic in the fan-in stage filters each of the 32 signals allowing only those signals to pass that are for the target endpoint.

Each of the several filtering stations also make use of data buffers which momentarily store the electrical data packets in a first-in, first-out manner. Additionally, each buffer has logic to monitor the amount of data present. If any buffer is filling faster than the receiving endpoint host is able to empty that buffer (for example, in case multiple streams are simultaneously directed to the same endpoint), logic in the EONIC generates a control packet that is broadcast from the laser corresponding to the endpoint in question. This mechanism provides flow control concerning potential overflow in the corresponding buffer by notifying any senders to that particular endpoint by means of a priority packet to the potentially overflowing buffer to stop sending. Such flow-control messages are short, a few bytes in length, and may be quickly injected back into the DBOI by the corresponding EONIC, where they are quickly received and processed by their intended recipients.

In essence, the original DBOI is an electrical-to-electrical distribution device that makes use of optics for distributing information. The optical stage allows fast and reliable broadcast distribution over larger distances, such as the volume of the DBOI and along the optical fibers where excess capacitance might retard electrical signals. The subsequent electrical processing takes place over shorter paths in the EONIC.

Modifications for a Packet-Flow Architecture

To induce the DBOI to function as a packet-flow module in the optical realm where both inputs and outputs are carried over single-mode fibers (to accommodate the necessary distances between racks in a data center, for example), the EONICs were modified while the optical module was left unchanged. This allows, for example, the same optical module to be used throughout a data center and thereby leading to mass-produced, highly interchangeable parts, driving down costs. There are, of course, two flavors of EONIC modules, one designed for interfacing to c-nodes and one for interfacing to f-nodes.

Figure 17:
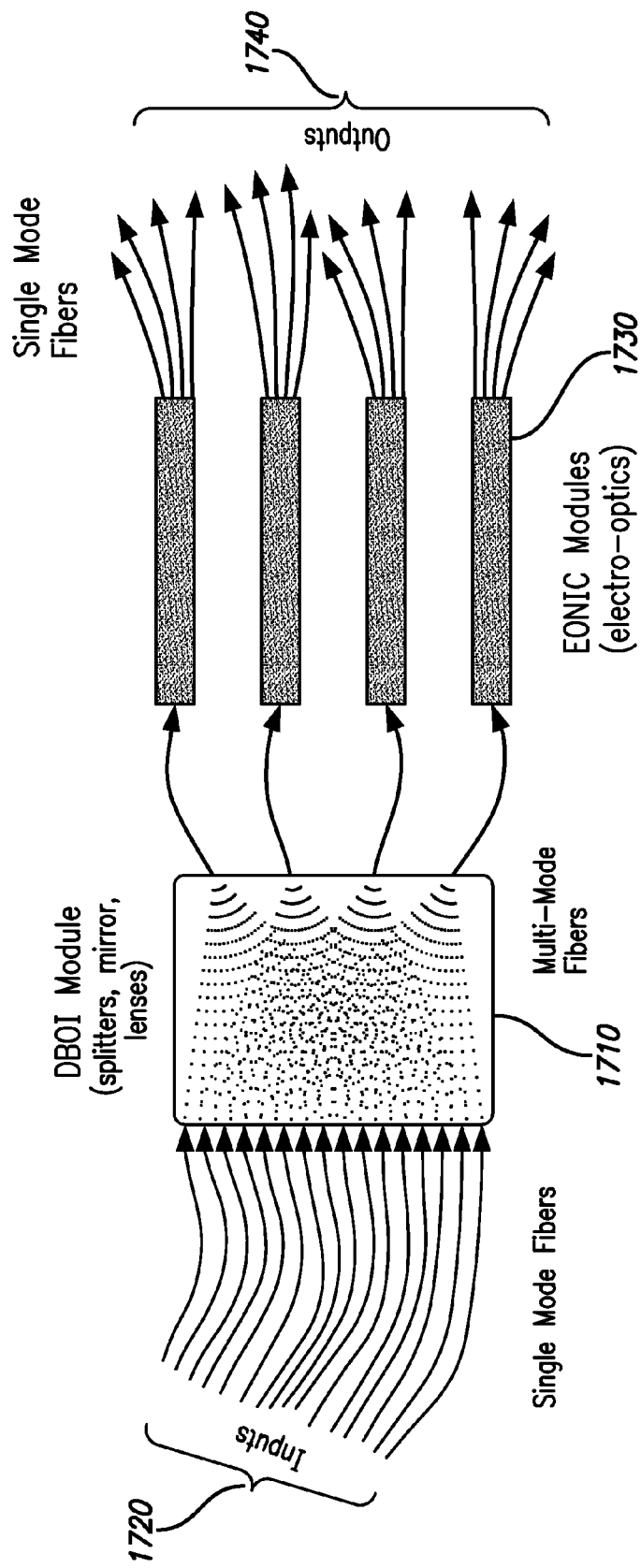
FIG. 17 illustrates a DBOI interconnect as modified as an optical in-out system.

FIG. 17 illustrates the DBOI in the packet-flow configuration. This DBOI f-module, as above, consists of two distinct parts. The optic or DBOI module 1710 has 32 single-mode fiber inputs 1720 that may originate from any point in the data center while the four EONIC modules 1730 each have eight single-mode output fibers 1740 that may have a destination to anywhere in the data center. Short, multi-mode fibers allow optically distributed signals originating in the optical DBOI module under the broadcast mode to be distributed and collected by each of the EONIC modules (again, each EONIC module receives an identical copy of each of the 32 inputs).

FIG. 17 is an illustration showing the DBOI interconnect as modified as an optical in-out system with only external optical fiber connections. The modification takes place in the electro-optical modules (EONIC) only, leaving the optical module (DBOI) untouched. For clarity, the illustration shows 16 inputs and four groups of 4 outputs, for a 16-to-16 distribution module. The existing implementations are for 32-to-32 distribution channels and 72-to-72 distribution channels. Each one of the inputs may be logically paired with one of the outputs, resulting in (here) 16 bidirectional optical channels. The mirror, not shown in FIG. 17, physically allows the DBOI inputs to be on the same face of the module as the outputs and halves the length of that module.

Data presented to any one of the inputs of the DBOI f-module may exit on any of the outputs, all of the outputs, or none of the outputs, depending on the destination information contained in the packet's header. In contrast, a packet entering a crosspoint or matrix switch may be present on none or only on a single exit port. This means that multicasting in a switch must be managed by data structures in the host or special hardware added to the crosspoint (switch). Multicasting in the DBOI is determined by the destination or group address and happens in parallel at those junctions where bifurcations would naturally occur.

Since the distribution module shown above allows optical signals of any kind to be distributed as broadcast, multicast, or even point-to-point, the term "optical data flow" seems a natural descriptive; however, since filtering decisions following internal broadcast are made based on the packet header, a better term would be "optical packet flow" where the optical packets are converted to electrical signals only for the purposes of forwarding, filtering, and amplifying. The shorthand of "packet flow" seems a better choice even though this term has been used in the past, although infrequently.

Advantages of the Packet-Flow Architecture

A packet-flow architecture exhibits performance and management advantages over a switched architecture.

DBOI as a Physical Layer

In its simplest functional form, a DBOI module is identical to its physical layer. Since all sending and all receiving channels are independent of each other, are fully connected, and may send and receive messages independently and simultaneously, the resulting network fabric easily supports any type of network protocol and fabric management desired by the user. Should a given application or parallel operating system expect a particular protocol, message-passing interface, or support switched-fabric management (routing tables, spanning trees, and so forth), a DBOI system may directly replace the switched fabric and still support the message and controlling structures unchanged by means of a simple wrapper that translates the various commands to DBOI-specific commands (such as destination specification) or to simple no-ops (for specific routing requests). A direct-replacement DBOI will be both faster and more efficient than the original architecture. By rewriting the communication code to take advantage of the strengths of the DBOI, even more efficiencies will be gained.

Full Bandwidth Utilization

A switched fabric typically open a path from node a to node b, say, through a network of switches whose states are fixed for the duration of the data transfer. The duplex nature of this path is seldom fully exploited, but the potential for its bidirectionality is necessary as it may be required at some time during the transfer to send an acknowledgment from b back to a. Unless there are many small simultaneously bidirectional messages, approximately half the bandwidth of a switched fabric is unused. The capability for duplex messages is required, but the underlying hardware is nonetheless under utilized at a rate approaching 50%.

This might not seem to be a serious concern, since the potential must exist for the reverse path, whether used or not. However, note that one the duplex path is established, the sending node a also has its incoming port reserved. That is, a cannot receive messages from any other nodes while it is sending to a particular node. Multiply this effect by many or all nodes establishing paths while not being able to receive, and it becomes clear that up to half the fabric bandwidth becomes unavailable. An estimated reduction of up to 50% of the theoretical bisection bandwidth of a switched fabric is quite possible in this case.

Figure 18:
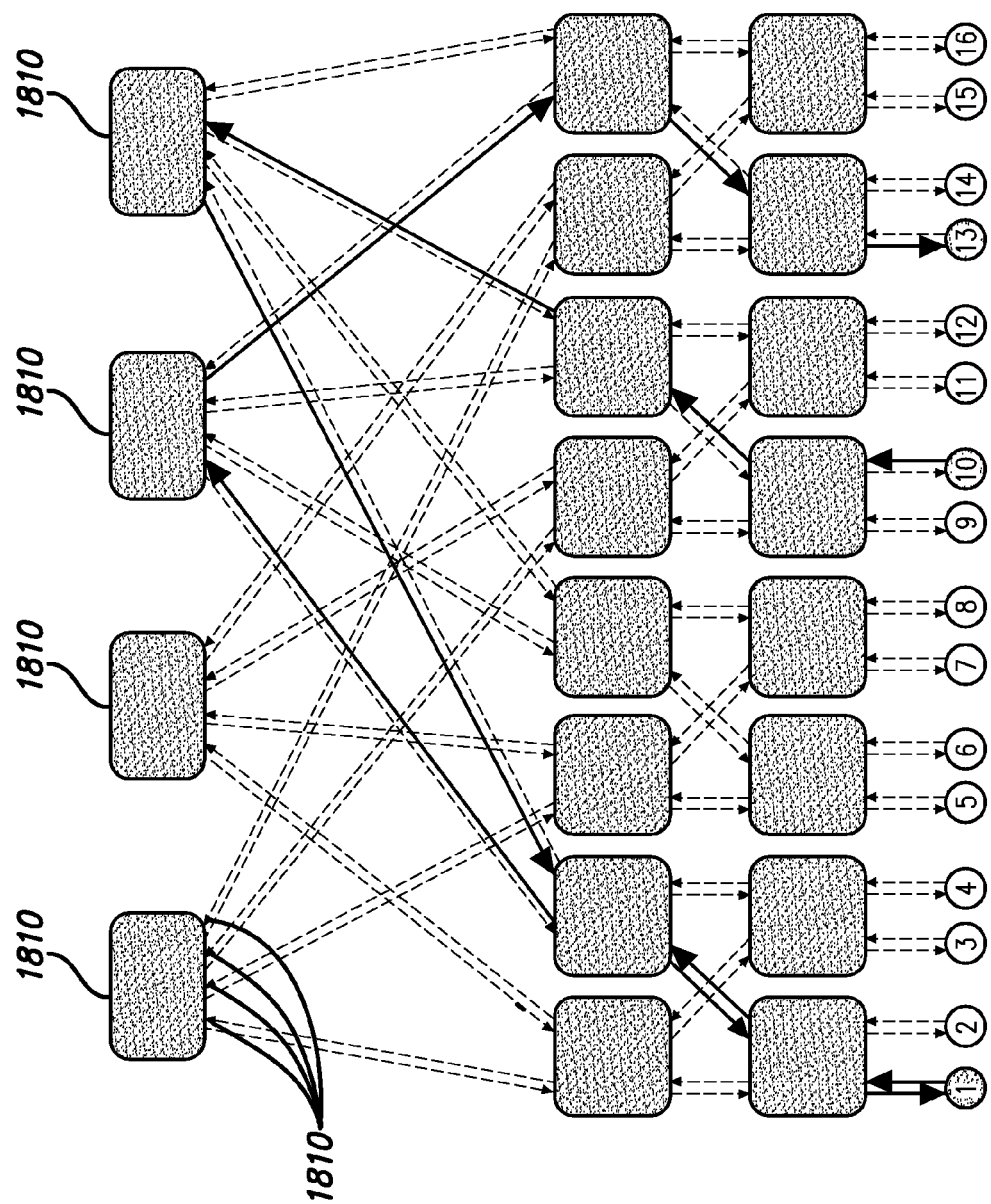
FIG. 18 illustrates a modified Clos network with bidirectional and logically independent channels (ports).

As an example of the versatility of the bidirectionality of the packet-flow module, consider the modified Clos fabric discussed above. FIG. 18 illustrates such a fabric based on f-nodes 1810 with four bidirectional ports 1820. Consider endpoint 1 at the bottom left of FIG. 18. The red arrows show that this c-node is busy transmitting data to c-node 13. Even while these data are traversing the selected path, c-node 10, for example, can be sending data to the same c-node 1. This bidirectionality is an architectural feature of the DBOI f-module that greatly enhances the efficiency of the packet-flow fabric.

The need for the reverse direction during any message transfer, whether long or short, is for acknowledgments or notifications of improper arrival, defective messages, message loss, and other potentially useful management tasks. However, the length of such bookkeeping messages is typically a few bytes, often orders of magnitude shorter than the primary message. Of course, in most fabrics, the reverse path is actually contains a stream of nulls simply to keep the duplex channel synchronized. So, while there may be actual bits being bidirectionally transmitted, a duplex channel is highly asymmetric from the point of view of information relevant to the processing nodes.

A packet-flow fabric allows full usage of the available bandwidth.

Improved Latency

In a switched fabric, actual paths established for data transfer are temporary connections between two fabric nodes or end nodes. For this reason, bit-serial synchronization must be re-established each time a path is closed or the entire fabric must be operated in a synchronous fashion. The first technique (data-derived method) adds additional latency to the message since a start-of-message sequence must be transmitted to allow time for the synchronization to take place before the message bits arrive. The second technique (pilot frequency method) requires an additional layer of hardware to spread a synchronizing signal to all endpoints in the fabric.

Low Latency is a Necessary Condition for Efficient
  Cache coherency messages,
  Shared memory data exchanges,
  Handshaking, and
  Barrier synchronization.

Resynchronization latency can be a major contributor to overall latency at or below the microsecond level between nodes. In addition to increased latency, resynchronization contributes to data skew since it impacts differential latency between endpoints receiving copies of the same message. This holds even if a multicast can be synthesized with little or no skew on the transmit side. The threat of such skew is typically overcome by barrier synchronization, which makes for even longer delays, adding to the effective latency.

Since the DBOI consists of separate, single-send broadcast channels, all receiving paths maintain synchronization to their bit streams as null sequences are sent even when there are no actual messages. This means, for example, that there is no additional acquisition time in the phase-locked loops required to receive a message. This synchronization takes place within the DBOI architecture in each EONIC without the need for an auxiliary pilot signal. These null sequences are ignored while a valid packet is recognized by a short header sequence announcing the start of a message.

All other sources of latency being equal, a packet-flow fabric exhibits lower latency and less skew than a switched fabric.

Enhanced Flow Control

An additional feature made possible by the packet-flow architecture with independent, bidirectional channels is the possibility of an efficient mechanism for sending and receiving short, high-priority control messages. Flow control between c-nodes is a feature of the original DBOI implementation. Expanding the flow-control concept to the f-node allows efficient sharing of nearest-neighbor state information, heartbeat messages to detect failing nodes, handshaking packets, and efficient and fast synchronization messages.

By construction, exit ports in the packet-flow architecture are independent of entrance ports. Only the exit ports have flow-control capabilities consisting of exit buffers, buffer-monitoring logic, and packet-generation and transmission logic. Control packets generated in the EONIC have outgoing priority over standard packets. This is achieved by a priority buffer operating in parallel with the normal exit buffers present at each of the exit ports. When an exit port has finished sending the current frame, the priority buffer is checked, allowing any priority frames to take precedence over the next message frame. Data packets consist of 64B66B frames and priority messages take a single frame. Thus the maximum delay experienced by a priority packet is a single frame.

When receiving priority packets, the situation is somewhat more involved since a priority packet may be meant for an f-node or a c-node. Following identification, a c-node priority packet makes its way through the EONIC following the normal logic until it reaches the appropriate exit buffer. There, it is directed to a priority exit buffer which is examined before the next packet is removed from the standard message buffer. If there is a priority frame in the output buffer, it is chosen over any contents of the standard buffer and read by the c-node.

If the priority packet is meant for another f-node, it follows the normal logic as described above and is placed in the appropriate priority buffer awaiting the next transmission to the destination f-node(s). If it is meant for the receiving f-node, it is tagged at the detector buffer prior to the normal packet-handling logic and sent to the appropriate f-node control logic where it may be used to 1. Update local nearest-node status tables (such as "available", "failed", etc.),
2. Provide a control signal for halting or resuming transmissions from any of the exit ports,
3. Collect and transmit usage and status data to a monitoring system, or
4. Provide information about the f-node's position in the fabric (such as tree or Clos level, pod ID, mesh indices), among other possibilities.

The issue of buffer size is usually raised with there being no universal answer. Large buffers can queue a large number of packets before the flow-control mechanism takes charge. However, the size must certainly be large enough to accept messages in transit before flow control cuts them off at the source. This lower bound depends on the size of the network, length of the standard packets, latency of priority messages across the fabric, and fabric diameter. In some cases, a simulation of the fabric and its message traffic might be required.

Priority packets are typically quite short compared to standard messages and their processing in the EONICs bypasses much of the internal logic. In a fabric within 10 gigabit/second data channels, a typical end-to-end latency for a priority frame is of the order of a few 10 s of nanoseconds for transmission between nodes, detection, identification, and processing within the receiving f-node.

Full Use of Redundant Paths

The set of possible paths between any two c-nodes provides a means of communication redundancy in case of local congestion, a basis for "self-healing" in case an f-node fails, and generally ensures a more robust system the larger this set becomes. However, in switched fabrics where large routing tables must be maintained at each f-node, the spanning-tree algorithms typically prune the number of allowable paths to a manageable size, thus limiting the response of a switched fabric to problems of congestion and node failure by removing all additional connectivity.

In a packet-flow fabric, where each forwarding decision is a local one, there is no need for pruning the paths or for comprehensive routing tables. In short, the spanning-tree management system is simply not needed.

Also note that the need for path pruning in switched fabrics biases the choice of topology away from the Clos networks and the torus since these two topologies produce very large path redundancy: if the redundancy is not used, why pay for the hardware to bring it about?

The full set of redundant paths are available for use in a packet-flow fabric.

Packet-Flow Fabric Management

Central Issue

The central issue in fabric management is to ensure that any particular message will reach its destination in spite of possible endpoint contention and fabric congestion. Such management should be done efficiently and with minimum delay between source and destination. As indicated above, management of switched fabrics is a central issue in the design and implementation of large computer systems and imposes costs beyond those of fabric hardware and maintenance. As the number of participating nodes increases, fabric management becomes more complex, difficult to effect, and costly. At issue is maintaining ever larger routing tables with up-do-date copies distributed throughout the fabric.

"Congestion" occurs in switched interconnects when a path is selected that prevents any other messages from using any of the switches establishing the first path. A good analogy is traffic control where a traffic light allows traffic to proceed by stopping cross traffic. "Contention" occurs at the edge of an interconnect or fabric when multiple messages are directed to the same endpoint or fabric port. An analogy would be all passengers attempting to exit an airplane through the same door at the same time. Both of these fabric problems are the result of path blocking.

Many of the protocols devised to enhance access to data items in server farms exist as work-arounds to structural problems imposed by the nature of switched fabrics. Likewise, implementation details of general access methods (those independent of the fabric architecture) often dictate the choice of particular topologies and architectures that work well with the chosen protocols, hardly an optimal design methodology.

In contrast to switched fabrics (networks of switches and routers), a fabric based on the DBOI is a packet-flow fabric, meaning that switches and hardware-enforced routing are not required nor would such routing enhance system performance. The hardware associated with switching and management of switched networks is absent in these fabrics, making for a simpler and easier-to-maintain system.

The implementation of an active packet-flow fabric management based on node-local decisions is achieved by exchanging status information concerning local congestion that is passed between neighboring nodes and maintained locally in small tables corresponding to f-node exit ports. Each f-node has information about its particular location within the fabric (such as row and column within a Clos network, level and order within a tree network, and an xyz index in a three-dimensional torus, etc.). Other than this fabric-wide knowledge concerning node location, information needed, for packet routing is obtained by exchanging status data between neighboring fabric nodes.

At some stage, prior to entering the fabric or perhaps in a gateway to the multi-processor system itself, standard addresses such as IP addresses or database pointers are translated to or encapsulated by destination addresses within the interconnect fabric. Such addresses need to contain at least a reference to the physical location of the destination f-node along with an indication of the destination c-node and any target process or computing core located at that c-node. For a free-form database or content-addressable system, only a specification as to what information is being sought (in the form of a hash index, for example) might be sufficient. It is not necessary at this point to address the many additional details needed for a reliable message-passing system such as the framing of packets from bit streams and the questions of check sums and error-correcting codes, just be aware that a packet in the packet-flow system is not all that different from a packet in a switched fabric. Simply assume that packets entering the fabric are structured in the usual manner following a framing operation on the bit streams before transmission. The usual check sums and error-correction codes are present along with an encoded destination addresses. In particular, a destination address might consist of indices specifying the location of the destination f-node. The essential difference between the two methods is that switched packets are directed to their destination by global routing tables while flow packets find their own way to their destination using information local to each f-node in the particular path taken. At each step, a packet is forwarded or rejected in the progression from source to destination.

Node Failure & Recovery

Any particular f-node may fail. Node failure must be recognized by the node's neighbors, typically by means of priority heartbeat packets or noting absence of responses to queries during handshaking (via an ACK/NACK mechanism, for example). Recovery from such failures is generally referred to as "self healing."

"The self-healing capability enables a routing based network to operate when one node breaks down or a connection goes bad. As a result, the network is typically quite reliable, as there is often more than one path between a source and a destination in the network."

With the introduction of the packet-flow module, routing decisions become local operations, obviating the need for a global management structure. Locally, simple state machines in the fabric nodes operating on received packets with destination headers can lead to a fabric that self manages and self heals. In short, a self organizing and self routing system may be obtained.

Torus Routing

Self-routing in the grid or torus is the simplest case and will be described first. The other topologies make use of some of the features discussed in this section, particularly flow control and priority packets.

Spanning-Tree Routing (Switched Fabric)

Given the large number of possible paths (without detours or loops) between distant nodes in the grid or torus (cf. Eq. 11), pruning the spanning tree becomes a central issue for managing such a fabric. Note that (for the grid), all properly selected paths are equidistant as long as the distance measure follows the Manhattan metric. For the torus, at least one of the 8 possible sets of paths is minimal, so a proper pruning algorithm would need to identify a minimal set and discard the others. However, this minimal set depends on the relative distance between the two endpoints, which varies across the fabric and presents a very large number of choices for a typical packet.

Either a huge spanning tree must be stored at each node, reflecting all possible destinations reachable from that node (namely all) or the spanning tree must be recomputed and pruned by the (unstable) spanning-tree algorithm each time a packet enters a node.

Packet-Flow Routing (Packet-Flow Fabric)

Consider a two-dimensional network of f-nodes where each f-node has an internal representation of its own position in the fabric. A representation of such a position would be by the pair $\{n_x, n_y\}$ where n is an integer indexing the f-node within the grid and the subscripts refer to the two grid dimensions or directions. For example, (0,0) might refer to the f-node in the lower left corner of the grid in FIG. 15. Suppose node $\{x, y\}$ receives a packet with destination header $\{a, b\}$. There are four possible paths whereby the packet may leave any f-node (excepting the special case of a node on the edge or corner of the fabric, which is a simple special case to treat). In the special case where the destination is in the same f-node as the originating c-node simply exit the f-node on the appropriate c-node path.

Compute path differences by forming the absolute value of the differences between the current position and the destination as $\Delta_x = |x-a|$ and $\Delta_y = |y-b|$. If both $\Delta_x$ and $\Delta_y$ are zero, the packet is at its destination f-node and may be passed to the destination c-node which is contained in the second part of the packet header. If one of the Δs is zero and the other is not, there is only one exit choice for the packet (apart from the exception discussed below). To identify this single choice, suppose $\Delta_x$ is not zero while $A_y$ is zero, form the two differences |x−a−1| and |x−a+1|, which computes the distance along the x-direction of the path between the two neighboring f-nodes and the destination. The port with the smaller difference is chosen as the other choice would lead away from the destination.

If both differences are non-zero, there are two equally valid choices for the exit port, and the two choices may be discovered by forming the differences with ±1 for the x-direction, as above, and for the y-direction in a similar manner. The x-port with the smaller difference is chosen as is the y-port with the smaller difference. Either the indicated x-port or the indicated y-port is a valid exit port since both lead towards the target and an arbitrary choice between them may be made. In this way, the packet finds its way to the proper destination along one member of the set of shortest paths using only local information. The particular path is not predictable as the "arbitrary" choices may depend on external factors as described below.

The three-dimensional grid has three numbers specifying an f-node location and the destination address, with the exit algorithm the same as described above but for three differences and six possible directions. Edge differences are automatically set to −1 indicating an incorrect exit port and the arithmetic in case of the torus is modulo the length of the corresponding mesh size (measured in number of f-nodes, of course).

This basic routing method is guaranteed to work within a packet-flow grid or torus. However, there are improvements possible that become important when there is heavy traffic in the fabric that may give rise to the possibility of congestion at down-stream f-nodes. Such congestion, which would manifest itself as contention for the set of exit ports available to a given packet as it finds its path, will be considered in the routing algorithms described in the next section.

Note that this algorithm is local to each f-node and is simple enough in execution to be implemented in a state machine rather than a general-purpose processor.

Decisions between two or three (in the 3D case) otherwise equal choices may be made according to exit-port tables that indicate the busy state of the receiving node. These small tables (4 or 6 bits each, depending on dimensionality) are maintained by priority packets as discussed above.

Enhancements to the Packet-Flow Routing Algorithm

Each exit port has an associated buffer where packets accumulate when the incoming packet rate for that port exceeds its exit rate. Under normal traffic conditions, each packet is taken from this exit buffer as soon as it enters, so there is minimal delay or latency penalty (the buffer acts as a first-in, first-out queue and simply transmits the packet as it is received). However, under high traffic conditions, any exit buffer may start to fill faster than it can be emptied. If buffer capacity is about to be reached, a flow-control mechanism engages and a priority message is sent to the appropriate neighboring nodes as described above.

Any priority message is examined as discussed in the previous section and is simply passed on if its destination is a local c-node. If it is a flow-control message for the receiving f-node, it triggers a "stop-sending" event in the corresponding exit queue and sets a "busy" or lock bit in that buffer's control mechanism. Any other priority message is simply passed on the appropriate exit port.

Once the exit buffer in the target node begins to clear out, another priority message is sent indicating that the pathways are clear. In this way, a heavy traffic load can be managed without losing any data. Certain packets may well be delayed, either in the exit buffer or by a delay in forwarding the packet from a prior f-node's exit buffer, or, ultimately, by delaying a pending transmission from an originating c-node.

Node Failure and Fabric Robustness

Any particular f-node may fail. Should this happen, routing capabilities are lost as well as access to the local c-nodes. A fabric-wide heartbeat mechanism or an occasional query to neighboring f-nodes may be used to identify non-responding or failed f-nodes. (Failed c-nodes may be identified in a similar manner.)

When a packet attempts to access a failed node, the routing algorithm increases one of the above differences and chooses a detour routing consistent with the available status information as described. Once one detour step has been made, the packet proceeds from its new fabric position with the proviso that the originating f-node directing the detour is temporally removed from the set of possible paths as a guard against packet loops.

Packet-flow routing in the grid or torus might well be the simplest and most effective local mechanism to use, making the torus, in some sense, a preferred topology.

Clos Routing

Only three-level fabrics will be considered here since the higher-level fabrics are treated by an extension of this case. There are three cases for a three-level Clos fabric. Communicating c-nodes are (cf. FIG. 11)
1. on the sane f-node,
2. on the same row, or
3. on opposite sides of the fabric.

Communicating c-nodes residing in the same column are either on the same f-node (case 1) or on opposite of the fabric (case 3). In case 1, packets with destinations in the same f-node as the originating c-node simply exit the f-node on the appropriate c-node exit and any port contention is handled by the flow-control mechanism described above.

Packets with destinations in the same row as the originating c-node (case 2) only have a single possible f-node exit in a three-level structure. This exit must be taken and port contention, whether at the f-node in the middle layer or the originating layer, is handled by the flow-control mechanism.

In case 3, assume that each f-node knows its position in the fabric (level or row index and column index). Destinations 1 to $\frac{1}{4} p^2$ are in the bottom half and $\frac{1}{4} p^2+1$ to $\frac{1}{2} p^2$ are in the top half, where p is the number of ports in an f-node as in the previous section. Thus a simple computation involving sending node index and destination node index determines which of the cases is in play.

The simplest way to manage the case-3 situation is to choose the exit port at random or in round-robin fashion and let flow control take care of possible contention encountered on the way to the destination. While probably satisfactory for many applications, the drawback to this method is that a traffic-independent choice of exit port is not optimum. For example, contention in the forward direction could render one or more of the choices suboptimal and contribute to eventual port contention (which could occur in any of the three levels of f-nodes).

A more controllable method of choosing the exit port would be to have a set of tables, one for each side of each f-node. The tables would essentially be maps consisting of single-bit memory cells corresponding to f-nodes in the destination path that have busy exit ports. Updating of these tables is done by priority packets reflecting the change in state of the respective ports in neighboring f-nodes.

Note that a given entrance port in a receiving f-node is busy only if the corresponding exit port in the transmitting f-node is busy, so it is not necessary to provide tables and strategies for the entrance ports.

Modified Clos Routing

The modified Clos network exhibits only the first two cases since all c-nodes are on the same side or row (cf. FIG. 13) and is treated in much the same manner as described above.

Pod-Based Routing

The use of pods (described in a previous section) essentially multiply the number of port maps that must be maintained since each packet-flow node within a pod must maintain tables for its exit ports. Other than this change, the local routing methods are much as described above under the Clos fabric.

Tree and Fat Tree Routing

Since both the Clos and tree topologies are multiple-level systems, the treatment of packet-flow routing in the tree and fat-tree structures is similar to the Clos description above. A key difference lies in the construction and maintenance of exit-port status tables if that method is selected. Otherwise, the priority flow-control packets flow back through the various subtrees, halting or delaying packets from leaving the identified ports or forcing the selection of alternate ports as required.

Broadcast Routing & Packet Identifiers

By dedicating a c-node task to the generation of sequential or monotonically increasing identifiers (IDs) for each non-priority packet generated within the system, a routing system based on the inherent broadcast capability of the f-node is possible. Admittedly, the best use of such a method would be in cases where network traffic is not pushed to the point of saturation, however its implementation is straightforward and it potentially solves a large class of problems, such as database access and maintenance and routing in telecommunications networks.

The ID generator receives requests for a new ID via a priority packet from any c-node in the process of assembling a packet for transmission into the fabric. Packet transmission would be delayed until a new ID was computed by the generator (typically by incrementing a counter) and received by the requesting task via another priority message. Again, priority messages are small and fast, making this method both possible and an attractive alternative.

Multiple generators are possible using different counters with different starting numbers or an indicator bit prefix to the ID by the particular generator. Thus certain c-nodes would direct their queries towards their own generators, reducing the possibility of overloading a single generator. Alternatively, an ID generator could be embedded in the fabric as a distributed service.

The idea of broadcast routing is straight forward: simply broadcast a received packet from each of the exit ports on the f-node (unless it is meant for that f-node, of course, in which case it is delivered to the destination c-node). A similar method may be found in the literature as "flooding" and is generally contrasted to routing [cf. Ref. 16].

Once a packet has been received at its destination, its ID is placed in an ID buffer so that subsequent packets may be checked and discarded if they have been seen before. Searching the ID buffer as packets are received is part of the filtering process described in a previous section. The ID buffer has a certain preset length, depending on fabric size, and IDs are dropped off the end as new ones arrive. In this way, an ID has a certain finite persistence yet enables even those packets experiencing delays to be filtered.

To reduce the inevitable multiplication of duplicate packets, each broadcast should be sent only in the "forward" direction as determined by destination address and the in-fabric address of the broadcasting f-node.

Summary

This portion of the instant disclosure has presented a new concept in large-scale computer interconnects based on a direct-broadcast, optical module. This module, as modified for use as a node in an interconnect fabric, has either 32 or 72 (in the present implementations) bidirectional and independent ports along with an electro-optical section that provides filtering logic for packets based on destination specifications. The Introduction section presented a short background of the Lightfleet interconnect and discussed the main problems in extending today's data centers to meet future needs. A short critique of today's solutions sets the stage for the following sections on topology and the particular packet-flow module. To recapitulate, today's solutions fall short in the following three areas:

Heterogeneous hardware, with an hierarchy of increasingly complex and costly switches, Congestion at each level of switching in (layered switches) in addition to port contention, and Need for spanning-tree algorithms and dynamic routing software to attain useful performance.

To provide a background for the use of the proposed packet-flow modules in large-scale interconnects, several network topologies that serve up to millions of endpoints and beyond were discussed. The detailed development of the properties of the various topologies, presented in the section on Network topologies, may be used as a basis for a design or comparison tool (e.g., in spread sheet form or as a small stand-alone application). Such a tool could materially aid data-center design and hardware selection. The conclusion of this section is that fabrics can easily be scaled to serve very large data centers if the same simple interconnect module is used throughout the fabric.

The third section on the Packet-flow fabric presented the modifications to the original Lightfleet interconnect and shows how it becomes an optical distribution module ideal to serve as a node in any communications fabric. The particular advantages of the packet-flow concept are discussed in detail and its main advantages over a switched-base fabric are emphasized. These advantages include Uniform, mass-produced, switchless broadcast modules Use of priority packets for local traffic control Full potential utilization of fabric bandwidth Improved latency and less skew over that provided by switches Fabric traffic management on a local level (no manager required)

Node-failure recovery (self-healing)

The final subsection in this third section presented, at a high-level, algorithms optimized for the several topologies discussed in the second section. These algorithms allow packets to "flow" through the fabric with only slight delays for decoding headers to obtain destination specifications. Problems of fabric congestion and port contention are managed effectively and swiftly, at the local, fabric-node level by means of short priority packets. The result is that very large fabrics may be managed locally without the need for global routing tables and spanning-tree algorithms. This latter property of the packet-flow fabric means that today's difficulties with scaling fabric management to large systems are not an issue for the fabrics proposed in this portion of the instant disclosure.

Fat-Tree Algorithm

The algorithm for assigning values to the various properties as in Tables 9 and 10 starts with ordering the prime factors of p (the number of ports in the basic module) in descending order with 1 excluded. The number of levels, l, is the length of the list of prime factors. Let the prime factors be $$f = P_1 P_2 \ldots p_l \quad \text{Equation (13)}$$

The root node has a number of branches equal to the first prime factor $p_1$ and there are l levels. The number of connections to each node in the tree must sum to p, so each of the $p_1$ branches carries $p/p_1$ connections. In the next level there are $p_1$ nodes and each node has $p_1p_2$–$p_2$ branches with $p/p_1/p_2$ connections in each branch. This system of products and differences continues until the edge is reach with $p/(p_1 \ldots p_l)=1$ connections in each branch from the bottom row of nodes to the leaves of c-nodes. Specifically, there are $$b_k = P_1 \ldots P_k - P_k \quad \text{Equation (14)}$$

branches from the $k^{th}$ level, where $k=2, \ldots, l$ and $$c_k = p/(p_1 \ldots P_k) = P_{k+1} \ldots p_l \quad \text{Equation (15)}$$

connections between the $k^{th}$ level and the next lower level. Note that k=1 represents the root level and $b_1=p_1$ with $c_1=p/p_1$; also, as a check, number of branches times the number of connections per branch plus the number of connection per branch from the node to the next higher level is equal to the number of ports, or $$p = b_j c_j + c_{j-1} \quad \text{Equation (16)}$$

The number of c-nodes is just the product of all the branch values as $$n = b_1 b_2 \ldots b_l \quad \text{Equation (17)}$$

and the number of f-nodes is a sum over the partial branches as $$m = 1 + b_1 + b_1 b_2 + \ldots + b_1 b_2 \ldots b_{l-1} \quad \text{Equation (18)}$$

The number of paths between any two c-nodes not on the same subtree is a product of the number of possible paths traversed going up the tree times the number down the tree, or $$\text{paths} = (c_1 \ldots c_l)^2 \quad \text{Equation (19)}$$

and the bisection bandwidth is just p/2.

For example, if p=12 as in FIG. 10, the list of prime factors is {3,2,2} and there are three branches from the root node, each branch containing 12/3 or 4 connections. The list of branches, starting with the root level is then {3,4,10} and the number of connections in a branch from each level is {4,2,1}. The number of c-nodes is 3×4×10, or 120, and the number of f-nodes is 1+3+12, or 16. The number of paths is (4×2×1)² or 64 and the bisection bandwidth is 12/2 or 6.

Note that the number of connections doubles at each level if p is a power of 2. For an arbitrary p, the connections increase as the partial products of the prime factors as shown in Eq. 15.

The described embodiments and examples are illustrative only and not intended to be limiting. Although embodiments of the present disclosure can be implemented separately, embodiments of the present disclosure may be integrated into the system(s) with which they are associated. All the embodiments of the present disclosure disclosed herein can be made and used without undue experimentation in light of the disclosure. Embodiments of the present disclosure are not limited by theoretical statements (if any) recited herein. The individual steps of embodiments of the present disclosure need not be performed in the disclosed manner, or combined in the disclosed sequences, but may be performed in any and all manner and/or combined in any and all sequences. The individual components of embodiments of the present disclosure need not be combined in the disclosed configurations, but could be combined in any and all configurations. Various substitutions, modifications, additions and/or rearrangements of the features of embodiments of the present disclosure may be made without deviating from the scope of the underlying inventive concept. All the disclosed elements and features of each disclosed embodiment can be combined with, or substituted for, the disclosed elements and features of every other disclosed embodiment except where such elements or features are mutually exclusive. The scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" "mechanism for" and/or "step for". Subgeneric embodiments of the invention are delineated by the appended independent claims and their equivalents. Specific embodiments of the invention are differentiated by the appended dependent claims and their equivalents.

REFERENCES

1. Mohammad Al-Fares, Alexander Loukissas, and Amin Vahdat, "A Scalable, Commodity Data Center Network Architecture," SIGCOMM'08, Aug. 17-22, 2008, Seattle, Wash., USA.
2. See, for example, http://www.theregister.co.uk/2010/05/25/cray_xe6_baker_gemini/
3. Yuichiro Ajima, Shinji Sumimoto, Toshiyuki Shimizu, "Tofu: A 6D Mesh/Torus Interconnect for Exascale Computers," Computer, vol. 42, no. 11, pp. 36-40, November 2009, doi:10.1109/MC.2009.370.
4. Changhoon Kim, Matthew Caesar, Jennifer Rexford, "Floodless in SEATTLE: A Scalable Ethernet Architecture for Large Enterprises," SIGCOMM'08, Aug. 17-22, 2008, Seattle, Wash., USA.
5. Radia Perlman and Donald Easterlake, "Introduction to TRILL," The Internet Protocol Journal, 14(3), 2011 pp. 2, Äì20.
6. See, for example, http://en.wikipedia.org/wiki/Network_topology
7. See, for example, http://en.wikipedia.org/wiki/Clos_network
8. See, for example, http://en.wikipedia.org/wiki/Ethernet_switch
9. See, for example, http://en.wikipedia.org/wiki/InfiniBand
10. Charles E. Leiserson, "Fat-Trees, Universal Networks for Hardware-Efficient Supercomputing," IEEE Trans. Comp., V c-34, N10, pp. 892-901, October 1985.
11. Stefan Goedecker and Adolfy Hoisie, Performance optimization of numerically intensive codes, Society for Industrial and Applied Mathematics, Philadelphia, 2001. (Available from Google Books.)
12. Radhika Niranjan Mysore, Adreeas Pamboris, Nathan Farrington, Nelson Haung, Pardis Mirim, Sivasankar Radhakrishnan, Vikran Subramanya, and Amin Vahdat, "PortLand: A Scalable Fault-Tolerant Layer 2 Data Center Network Fabric," SIGCOMM'09, Aug. 17-21, 2009, Varcelona, Spain.

What is claimed is:

1. A method, comprising: operating a switchless interconnect fabric including
a first packet flow module including a first plurality of ports, each of the first plurality of ports including at least a first pair of bidirectional and logically independent communications channels; and
a second packet flow module including a second plurality of ports, each of the second plurality of ports including at least a second pair of bidirectional and logically independent communications channels,
wherein data packets or messages are routed without routing tables, spanning trees or other fabric wide control mechanisms,
wherein there are no global patterns of switch settings and
wherein there is no global, top-down fabric control and monitoring.

2. The method of claim 1, wherein operating the first packet flow module includes operating a direct-broadcast, optical interconnect and operating an electro-optic network interface controller coupled to the direct-broadcast, optical interconnect.

3. The method of claim 2, wherein operating the electro-optic network interface controller includes receiving data via a plurality of optical inputs and transmitting data via a plurality of optical outputs.

4. The method of claim 3, wherein transmitting via each of the plurality optical inputs includes transmitting via a single mode optical fiber.

5. The method of claim 3, wherein receiving via each of the plurality of optical outputs includes receiving via a single mode optical fiber.

6. The method of claim 1, further comprising transferring data between the first packet flow module and an f-node,
wherein flow packets find their own way to their destination using information local to each f-node in a particular path taken.

7. The method of claim 1, further comprising transferring data between the first packet flow module and a c-node,
wherein flow packets find their own way to their destination using information local to each c-node in a particular path taken.

8. An apparatus, comprising: a switchless interconnect fabric including
a first packet flow module including a first plurality of ports, each of the first plurality of ports including at least a first pair of bidirectional and logically independent communications channels; and
a second packet flow module including a second plurality of ports, each of the second plurality of ports including at least a second pair of bidirectional and logically independent communications channels,
wherein data packets or messages are routed without routing tables, spanning trees or other fabric wide control mechanisms,
wherein there are no global patterns of switch settings and
wherein there is no global, top-down fabric control and monitoring.

9. The apparatus of claim 8, wherein the first packet flow module includes a direct-broadcast, optical interconnect and an electro-optic network interface controller coupled to the direct-broadcast, optical interconnect.

10. The apparatus of claim 9, wherein the electro-optic network interface controller includes a plurality of optical inputs and a plurality of optical outputs.

11. The method of claim 10, wherein i) each of the plurality optical inputs and ii) each of the plurality of optical outputs includes a single mode optical fiber.

12. The apparatus of claim 8, further comprising an f-node coupled to the first packet flow module,
wherein flow packets find their own way to their destination using information local to each f-node in a particular path taken.

13. The apparatus of claim 8, further comprising a c-node coupled to the first packet flow module.

14. The apparatus of claim 8, further comprising a third packet flow module including a third plurality of ports, each of the third plurality of ports including at least a third pair of bidirectional and logically independent communications channels.

* * * * *